(12) United States Patent
Kawada et al.

(10) Patent No.: US 7,760,440 B2
(45) Date of Patent: Jul. 20, 2010

(54) ZOOM LENS

(75) Inventors: Mayumi Kawada, Nagoya (JP); Ken Shimizu, Nagoya (JP)

(73) Assignee: Elmo Company, Limited (JP)

( * ) Notice: Subject to any disclaimer, the term of this patent is extended or adjusted under 35 U.S.C. 154(b) by 174 days.

(21) Appl. No.: 12/183,736

(22) Filed: Jul. 31, 2008

(65) Prior Publication Data

US 2009/0034089 A1      Feb. 5, 2009

(30) Foreign Application Priority Data

Aug. 3, 2007     (JP)  .............................. 2007-202794

(51) Int. Cl.
*G02B 15/14*     (2006.01)
(52) U.S. Cl. ...................................... 359/687
(58) Field of Classification Search .................. 359/687
See application file for complete search history.

(56) References Cited

U.S. PATENT DOCUMENTS 7,417,802 B2 *    8/2008   Horiuchi ..................... 359/687

FOREIGN PATENT DOCUMENTS

| JP | 5-72475 | 3/1993 |
|---|---|---|
| JP | 2000-227552 | 8/2000 |
| JP | 2003-140044 | 5/2003 |
| JP | 2004-272187 | 9/2004 |

* cited by examiner

*Primary Examiner*—William C Choi
(74) *Attorney, Agent, or Firm*—Ostrolenk Faber LLP

(57) ABSTRACT

The zoom lens 100 comprises, sequentially from the object side, a stationary first lens group 110 having positive refractive power; a second lens group 120, having negative refractive power, and that moves on the optical axis when changing the magnification; a stationary third lens group 130 that has positive refractive power; and a fourth lens group 140, having positive refractive power. The first lens group 110 comprises six lenses. The second lens L2 is a meniscus lens that is formed so as to have at least one aspherical surface. The aspherical surface of the second lens L2 is formed at the shape wherein there is no displacement in the thickness from the center portion to the edge portion. Doing so enables the effective correction of distortion and off-axis aberration on the wide-angle side, and the provision of a high-performance zoom lens that is small and has a high variable magnification.

6 Claims, 30 Drawing Sheets

Fig.2

LENS CONFIGURATION

| SURFACE NO. i | RADIUS OF CURVATURE Ri | SURFACE INTERVAL Di | REFRACTIVE INDEX Ndi | ABBE NUMBER $\nu$ di |
|---|---|---|---|---|
| 1 | 415.507 | 2.000 | 1.638539 | 55.4 |
| 2 | 34.619 | 14.637 | | |
| *3 | 145.829 | 4.500 | 1.525279 | 56.0 |
| *4 | 280.860 | 0.298 | | |
| 5 | 60.364 | 3.849 | 1.487490 | 70.2 |
| 6 | −1353.836 | 1.243 | | |
| 7 | 51.712 | 1.300 | 1.846660 | 23.8 |
| 8 | 28.510 | 6.161 | 1.487490 | 70.2 |
| 9 | −589.347 | 0.100 | | |
| 10 | 29.928 | 5.218 | 1.696797 | 55.5 |
| 11 | −1456.516 | VARIABLE | | |
| 12 | 139.134 | 0.800 | 1.834000 | 37.2 |
| 13 | 7.144 | 4.116 | | |
| 14 | −19.010 | 0.800 | 1.496999 | 81.6 |
| 15 | 9.208 | 2.600 | 1.846660 | 23.8 |
| 16 | 37.530 | VARIABLE | | |
| APERTURE | INFINITE | 0.600 | | |
| *18 | 10.634 | 2.400 | 1.739450 | 49.2 |
| *19 | −289.020 | 2.832 | | |
| 20 | 18.140 | 0.800 | 1.846660 | 23.8 |
| 21 | 8.630 | VARIABLE | | |
| 22 | 17.300 | 3.250 | 1.603112 | 60.6 |
| 23 | −9.550 | 0.800 | 1.846660 | 23.8 |
| 24 | −25.300 | 1.835 | | |
| 25 | 16.450 | 1.900 | 1.487490 | 70.2 |
| 26 | −1060.000 | VARIABLE | | |
| 27 | INFINITE | 3.460 | 1.516330 | 64.1 |
| 28 | INFINITE | 2.723 | | |

Fig.3

ASPHERICAL SURFACE COEFFICIENTS

| | CONIC CONSTANT (K) | 4th ORDER COEFFICIENT (A4) | 6th ORDER COEFFICIENT (A6) | 8th ORDER COEFFICIENT (A8) | 10th ORDER COEFFICIENT (A10) | 12th ORDER COEFFICIENT (A12) |
|---|---|---|---|---|---|---|
| 3 | 42.03046 | 1.07562E-05 | 1.72416E-08 | -5.11491E-12 | -1.39769E-14 | 5.92692E-17 |
| 4 | -36.21333 | 1.24075E-05 | 1.77516E-08 | 1.86832E-11 | -7.07334E-14 | 1.97436E-16 |
| 18 | -0.70923 | 1.25539E-05 | -3.15370E-07 | 7.16320E-09 | 5.47320E-10 | 0 |
| 19 | 0 | 4.50431E-05 | -8.77628E-07 | 3.20274E-08 | 1.63238E-10 | 0 |

Fig.4

VARIABLE LENS INTERVAL

| SURFACE NO. | WIDE-ANGLE END | MIDDLE POSITION | TELEPHOTO END |
|---|---|---|---|
| 11 | 0.700 | 15.609 | 24.701 |
| 16 | 26.713 | 11.804 | 2.712 |
| 21 | 6.203 | 3.191 | 5.369 |
| 26 | 3.358 | 6.370 | 4.192 |

Fig.5

OPTICAL SPECIFICATIONS

|  | WIDE-ANGLE END | MIDDLE POSITION | TELEPHOTO END |
|---|---|---|---|
| FOCAL LENGTH | 3.74 | 12.22 | 40.05 |
| FIELD ANGLE ($2\omega$) | 83.20 | 27.36 | 8.59 |
| FNo. | 1.85 | 2.31 | 2.80 |

Fig.13

LENS CONFIGURATION

| SURFACE NO. i | RADIUS OF CURVATURE Ri | SURFACE INTERVAL Di | REFRACTIVE INDEX Ndi | ABBE NUMBER $\nu$di |
|---|---|---|---|---|
| 1 | −1806.555 | 2.000 | 1.638539 | 55.4 |
| 2 | 29.267 | 1.280 | | |
| *3 | 31.896 | 4.500 | 1.525279 | 56.0 |
| *4 | 28.916 | 9.079 | | |
| 5 | 64.334 | 5.860 | 1.487490 | 70.2 |
| 6 | −73.494 | 0.100 | | |
| 7 | 43.411 | 1.299 | 1.846660 | 23.8 |
| 8 | 26.403 | 6.665 | 1.487490 | 70.2 |
| 9 | −475.895 | 0.100 | | |
| 10 | 28.097 | 5.047 | 1.696797 | 55.5 |
| 11 | 302.010 | VARIABLE | | |
| 12 | 93.049 | 0.800 | 1.834000 | 37.2 |
| 13 | 6.941 | 4.116 | | |
| 14 | −17.419 | 0.800 | 1.496999 | 81.6 |
| 15 | 9.256 | 2.600 | 1.846660 | 23.8 |
| 16 | 41.252 | VARIABLE | | |
| APERTURE | INFINITE | 0.600 | | |
| *18 | 10.634 | 2.400 | 1.739450 | 49.2 |
| *19 | −289.020 | 2.832 | | |
| 20 | 18.140 | 0.800 | 1.846660 | 23.8 |
| 21 | 8.630 | VARIABLE | | |
| 22 | 17.300 | 3.250 | 1.603112 | 60.6 |
| 23 | −9.550 | 0.800 | 1.846660 | 23.8 |
| 24 | −25.300 | 1.835 | | |
| 25 | 16.450 | 1.900 | 1.487490 | 70.2 |
| 26 | −1060.000 | VARIABLE | | |
| 27 | INFINITE | 3.460 | 1.516330 | 64.1 |
| 28 | INFINITE | 2.730 | | |

Fig.14

ASPHERICAL SURFACE COEFFICIENTS

| | CONIC CONSTANT (K) | 4th ORDER COEFFICIENT (A4) | 6th ORDER COEFFICIENT (A6) | 8th ORDER COEFFICIENT (A8) | 10th ORDER COEFFICIENT (A10) | 12th ORDER COEFFICIENT (A12) |
|---|---|---|---|---|---|---|
| 3 | 0.10071 | 5.63526E-07 | 4.37131E-09 | 9.64201E-12 | -2.54247E-15 | -1.21198E-16 |
| 4 | -0.97947 | 1.05346E-07 | 1.82578E-09 | 1.27747E-11 | 5.88612E-15 | -1.77781E-16 |
| 18 | -0.70923 | 1.25539E-05 | -3.15370E-07 | 7.16320E-09 | 5.47320E-10 | 0 |
| 19 | 0 | 4.50431E-05 | -8.77628E-07 | 3.20274E-08 | 1.63238E-10 | 0 |

Fig.15

VARIABLE LENS INTERVAL

| SURFACE NO. | WIDE-ANGLE END | MIDDLE POSITION | TELEPHOTO END |
|---|---|---|---|
| 11 | 0.700 | 15.609 | 24.701 |
| 16 | 26.713 | 11.804 | 2.712 |
| 21 | 6.203 | 3.191 | 5.369 |
| 26 | 3.358 | 6.370 | 4.192 |

Fig.16

OPTICAL SPECIFICATIONS

| | WIDE-ANGLE END | MIDDLE POSITION | TELEPHOTO END |
|---|---|---|---|
| FOCAL LENGTH | 3.70 | 12.12 | 39.95 |
| FIELD ANGLE ($2\omega$) | 81.18 | 27.14 | 8.60 |
| FNo. | 1.85 | 2.31 | 2.80 |

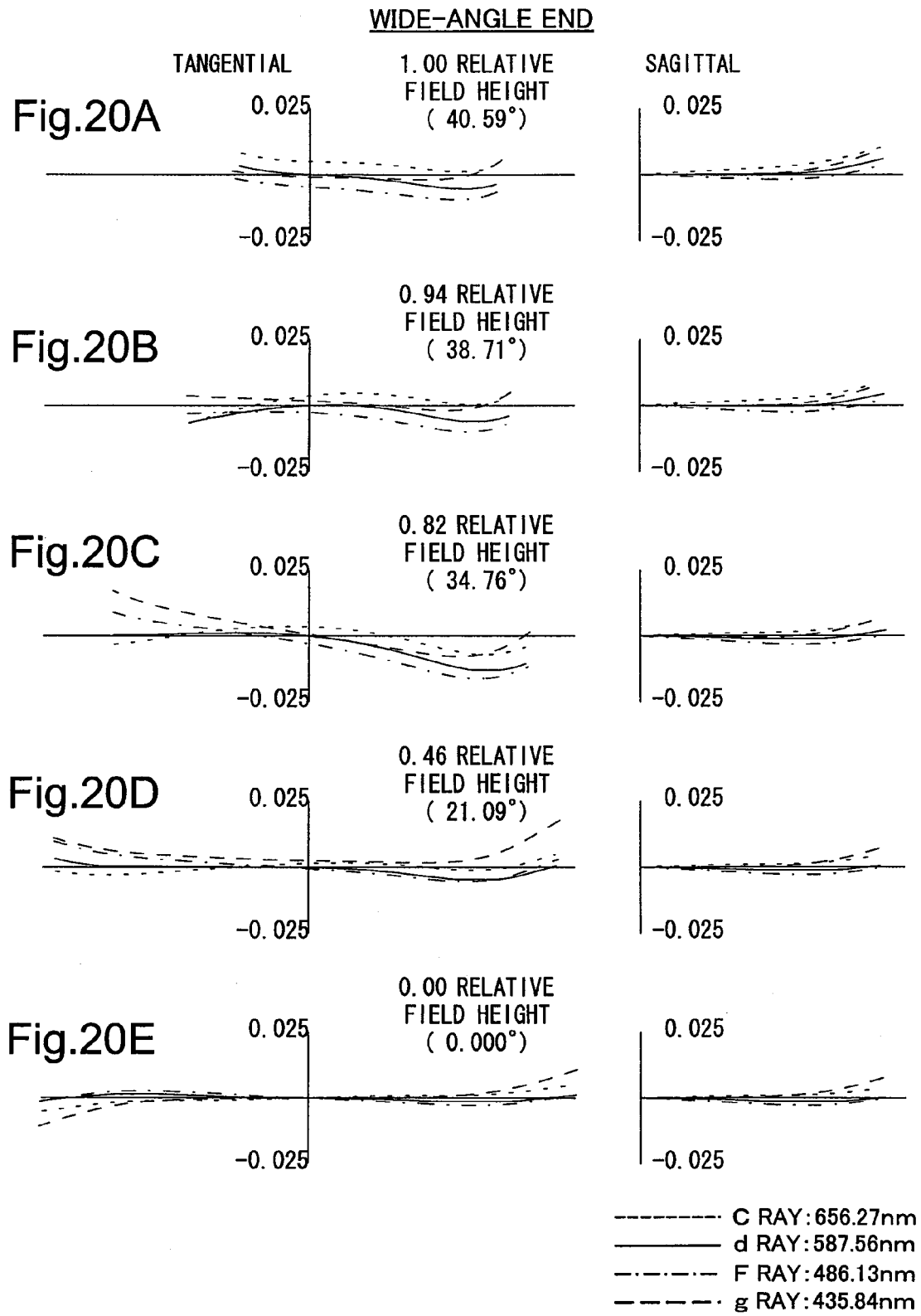

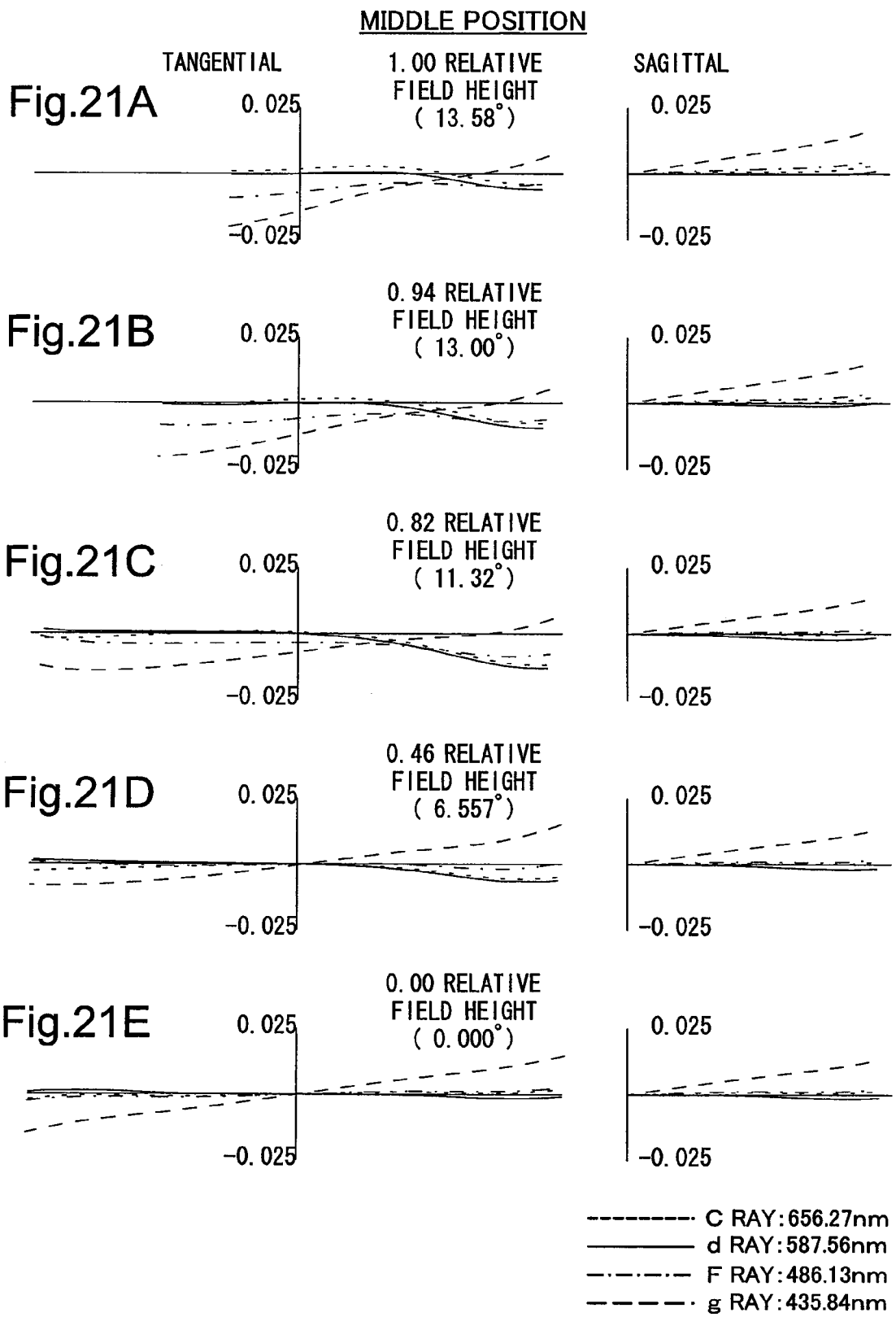

TELEPHOTO END
Fig.22A — TANGENTIAL / 1.00 RELATIVE FIELD HEIGHT (4.299°) / SAGITTAL
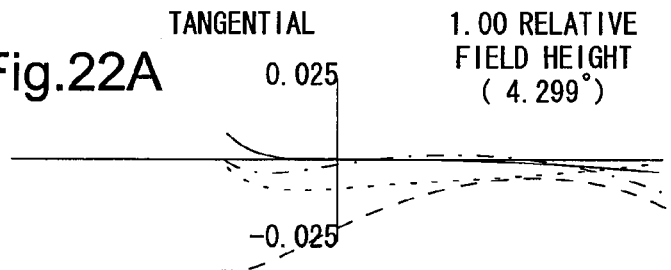
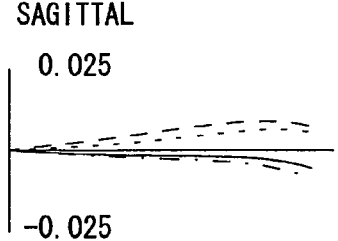
Fig.22B — 0.94 RELATIVE FIELD HEIGHT (4.045°)
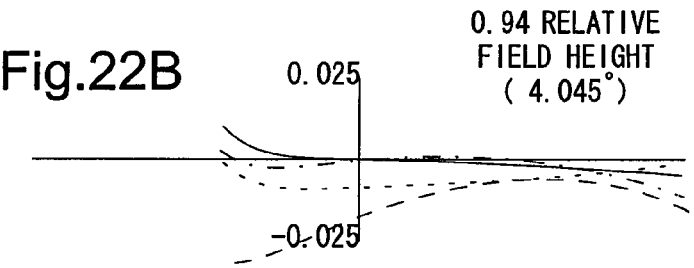
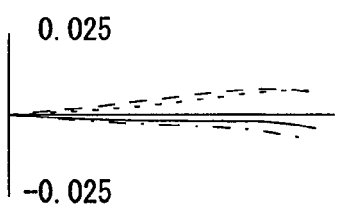
Fig.22C — 0.82 RELATIVE FIELD HEIGHT (3.537°)
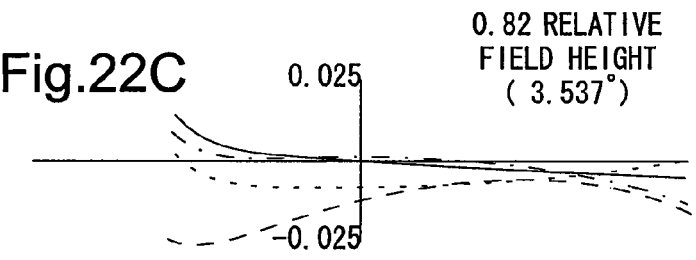
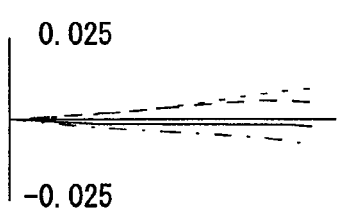
Fig.22D — 0.46 RELATIVE FIELD HEIGHT (2.006°)
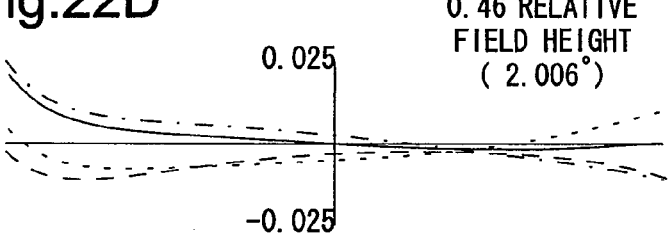
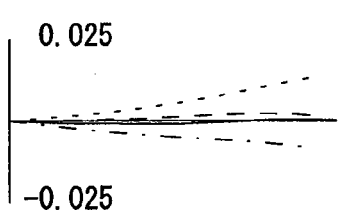
Fig.22E — 0.00 RELATIVE FIELD HEIGHT (0.000°)
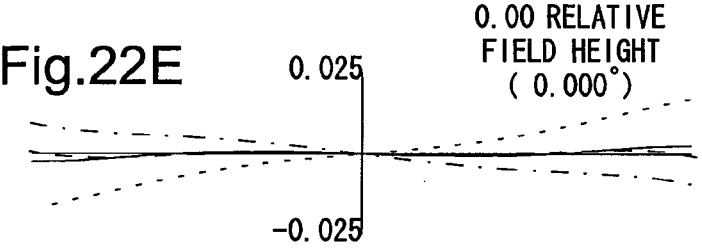
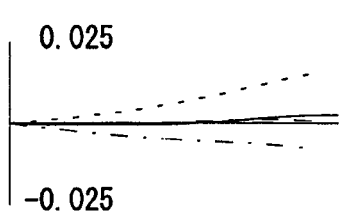
------- C RAY: 656.27nm
——— d RAY: 587.56nm
—·—·— F RAY: 486.13nm
— — — g RAY: 435.84nm

Fig.24

LENS CONFIGURATION

| SURFACE NO. i | RADIUS OF CURVATURE Ri | SURFACE INTERVAL Di | REFRACTIVE INDEX Ndi | ABBE NUMBER νdi |
|---|---|---|---|---|
| 1 | 228.140 | 2.000 | 1.638539 | 55.4 |
| 2 | 32.785 | 9.673 | | |
| *3 | -105.349 | 4.500 | 1.525279 | 56.0 |
| *4 | -90.547 | 1.402 | | |
| 5 | 77.803 | 4.326 | 1.487490 | 70.2 |
| 6 | -139.188 | 0.850 | | |
| 7 | 73.813 | 1.300 | 1.846660 | 23.8 |
| 8 | 34.030 | 0.713 | | |
| 9 | 35.521 | 6.285 | 1.487490 | 70.2 |
| 10 | -89.408 | 0.100 | | |
| 11 | 27.079 | 4.768 | 1.696797 | 55.5 |
| 12 | 154.453 | VARIABLE | | |
| 13 | 112.361 | 0.800 | 1.834000 | 37.2 |
| 14 | 7.014 | 4.116 | | |
| 15 | -21.150 | 0.800 | 1.496999 | 81.6 |
| 16 | 8.874 | 2.600 | 1.846660 | 23.8 |
| 17 | 33.861 | VARIABLE | | |
| APERTURE | INFINITE | 0.600 | | |
| *19 | 10.634 | 2.400 | 1.739450 | 49.2 |
| *20 | -289.020 | 2.832 | | |
| 21 | 18.140 | 0.800 | 1.846660 | 23.8 |
| 22 | 8.630 | VARIABLE | | |
| 23 | 17.300 | 3.250 | 1.603112 | 60.6 |
| 24 | -9.550 | 0.800 | 1.846660 | 23.8 |
| 25 | -25.300 | 1.835 | | |
| 26 | 16.450 | 1.900 | 1.487490 | 70.2 |
| 27 | -1060.000 | VARIABLE | | |
| 28 | INFINITE | 3.460 | 1.516330 | 64.1 |
| 29 | INFINITE | 2.630 | | |

Fig.25

ASPHERICAL SURFACE COEFFICIENTS

| | CONIC CONSTANT (K) | 4th ORDER COEFFICIENT (A4) | 6th ORDER COEFFICIENT (A6) | 8th ORDER COEFFICIENT (A8) | 10th ORDER COEFFICIENT (A10) | 12th ORDER COEFFICIENT (A12) |
|---|---|---|---|---|---|---|
| 3 | -3.46812 | 1.35014E-07 | 6.35619E-10 | -1.17380E-12 | -1.61002E-14 | -6.60601E-17 |
| 4 | 5.61393 | -1.11620E-07 | -5.38678E-10 | -2.75073E-12 | -1.82186E-14 | -3.35501E-17 |
| 18 | -0.70923 | 1.25539E-05 | -3.15370E-07 | 7.16320E-09 | 5.47320E-10 | 0 |
| 19 | 0 | 4.50431E-05 | -8.77628E-07 | 3.20274E-08 | 1.63238E-10 | 0 |

Fig.26

VARIABLE LENS INTERVAL

| SURFACE NO. | WIDE-ANGLE END | MIDDLE POSITION | TELEPHOTO END |
|---|---|---|---|
| 11 | 0.700 | 15.609 | 24.701 |
| 16 | 26.713 | 11.804 | 2.712 |
| 21 | 6.203 | 3.191 | 5.369 |
| 26 | 3.358 | 6.370 | 4.192 |

Fig.27

OPTICAL SPECIFICATIONS

|  | WIDE-ANGLE END | MIDDLE POSITION | TELEPHOTO END |
|---|---|---|---|
| FOCAL LENGTH | 3.80 | 12.34 | 40.00 |
| FIELD ANGLE ($2\omega$) | 79.64 | 26.84 | 8.59 |
| FNo. | 1.85 | 2.31 | 2.81 |

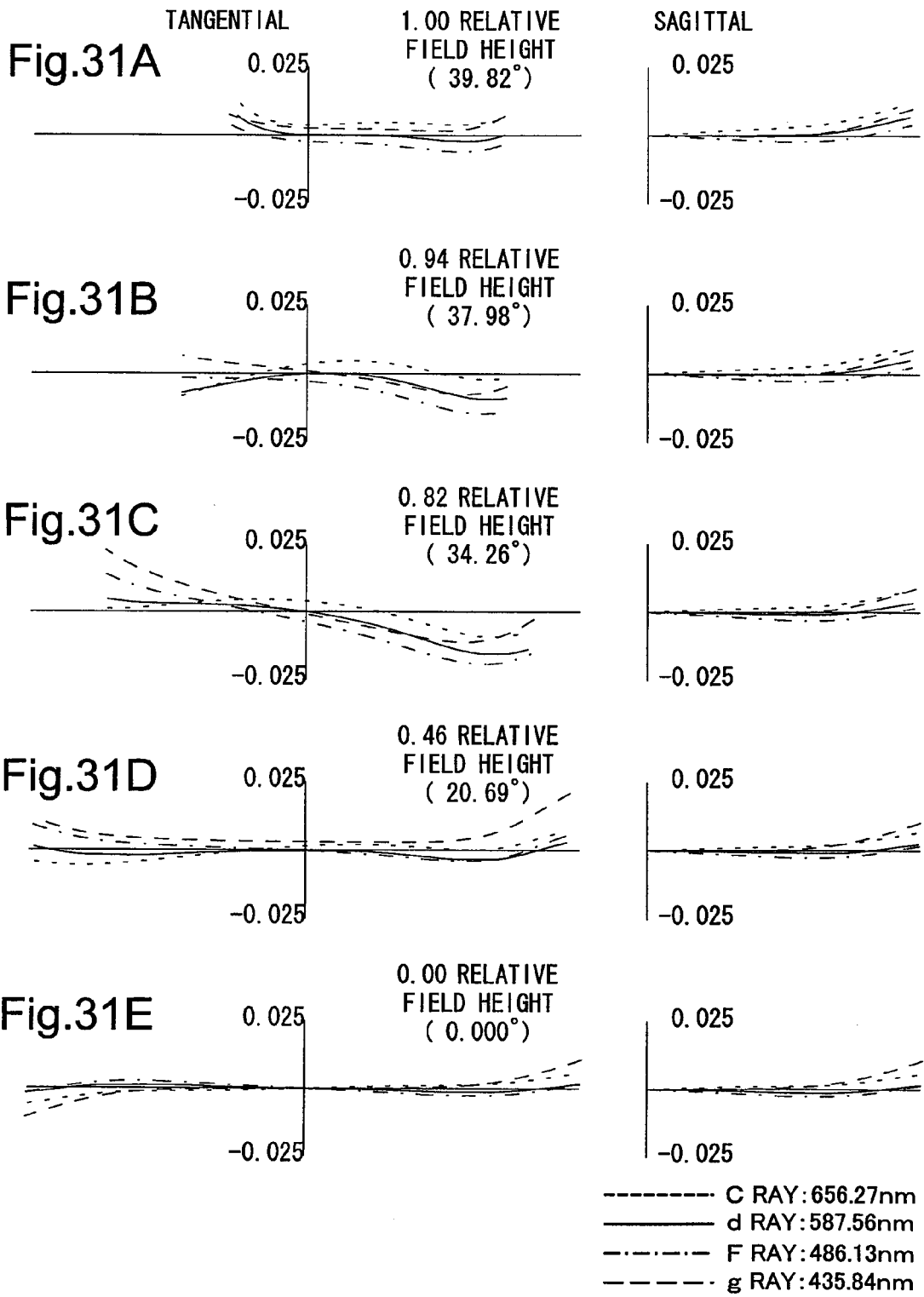

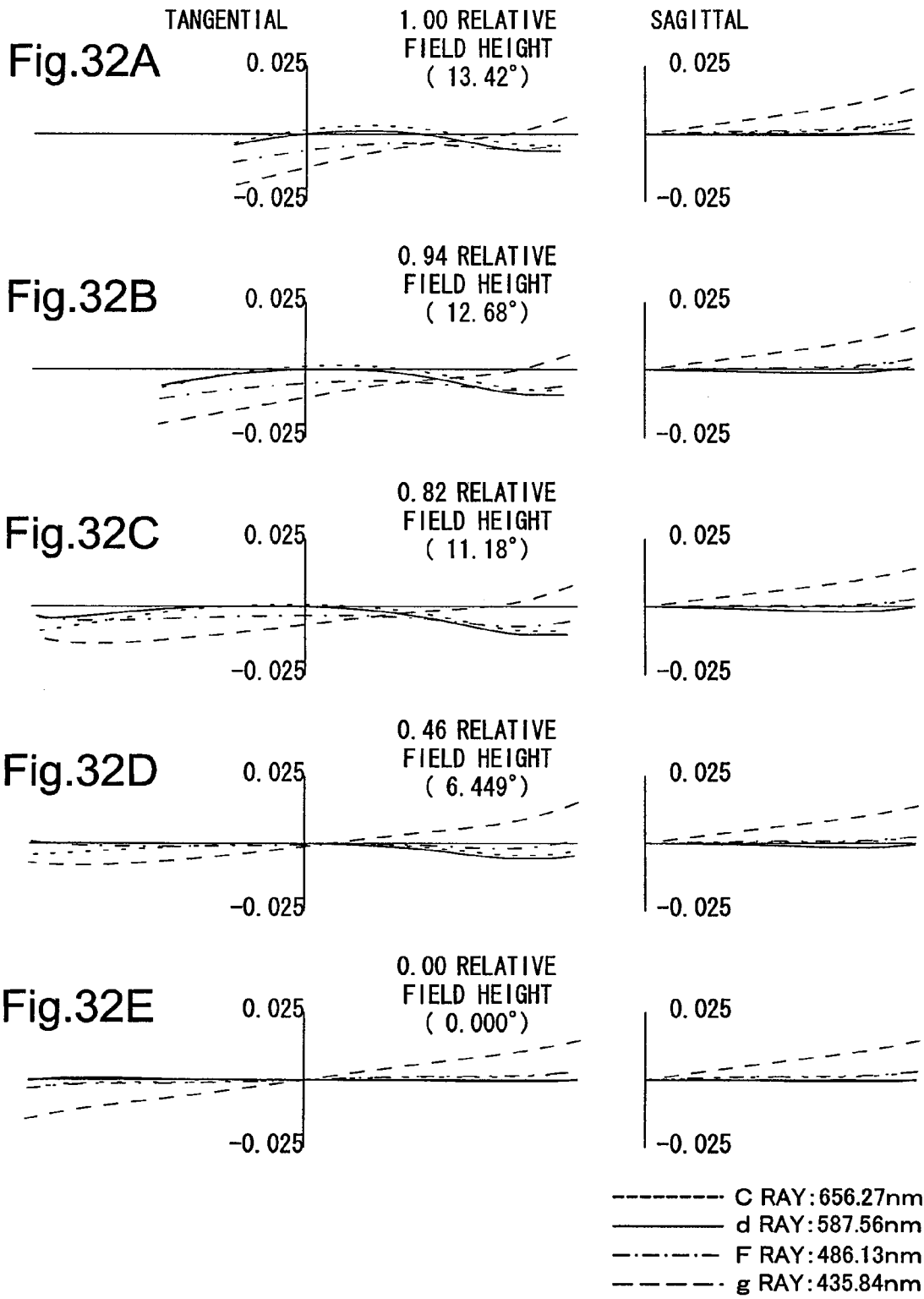

TELEPHOTO END
Fig.33A
TANGENTIAL
1.00 RELATIVE FIELD HEIGHT (4.294°)
SAGITTAL
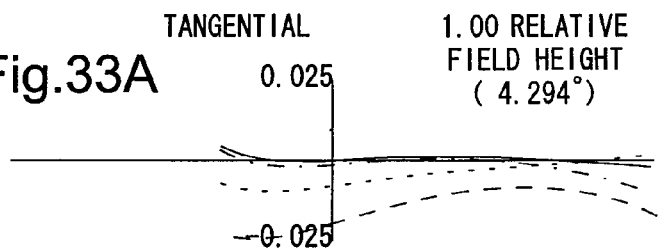
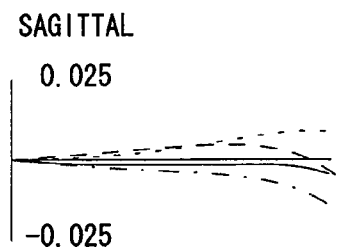
Fig.33B
0.94 RELATIVE FIELD HEIGHT (4.039°)
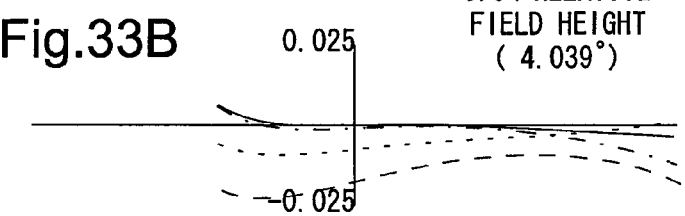
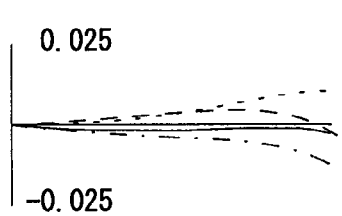
Fig.33C
0.82 RELATIVE FIELD HEIGHT (3.531°)
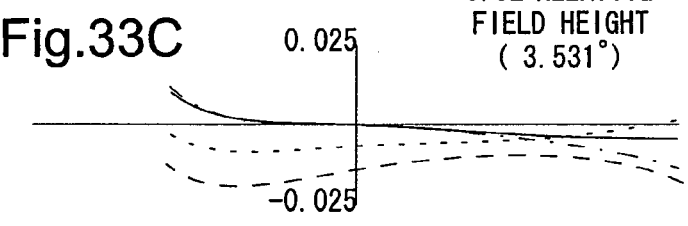
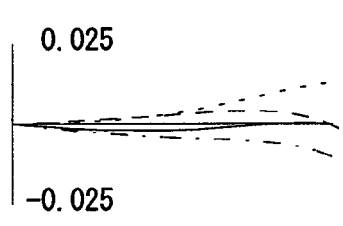
Fig.33D
0.46 RELATIVE FIELD HEIGHT (2.002°)
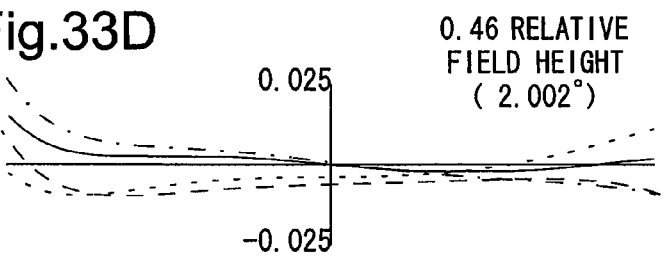
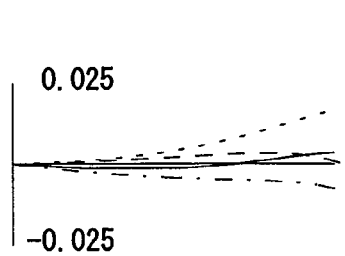
Fig.33E
0.00 RELATIVE FIELD HEIGHT (0.000°)
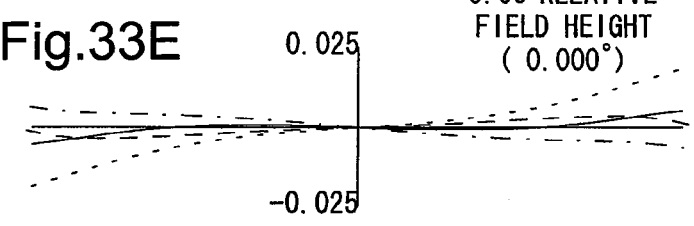
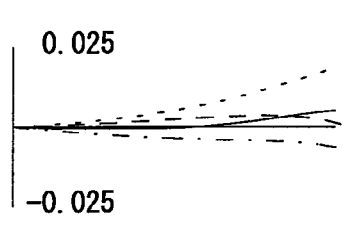
--------- C RAY: 656.27nm
———— d RAY: 587.56nm
—·—·— F RAY: 486.13nm
— — — g RAY: 435.84nm

ZOOM LENS

CLAIM OF PRIORITY

The present application claims the priority based on Japanese Patent Applications No. 2007-202794 filed on Aug. 3, 2007, the disclosures of which are hereby incorporated by reference in its entirety.

BACKGROUND

1. Technical Field

This invention relates to a zoom lens that employs aspheric lenses.

2. Related Art

In the imaging device of a video camera or the like, a zoom lens with a wide field angle is commonly used. In the past, many zoom lenses of this type had a four-group constitution with refractive power that is positive, negative, positive, and positive, in order from the object side. In a four-group constitution zoom lens, with the first lens group and the third lens group fixed, the second lens group is moved in the optical axis direction to change the magnification (zoom); and the fourth lens group is moved to correct variation of the image surface that occurs with displacement and is moved in the optical axis direction to focus. This so-called four-group focus zoom method is currently the most common one.

In this zoom lens, the angle can be widened through structuring the first lens group from five lenses in a zoom lens that has a zoom ratio of about 10×.

SUMMARY

However, in the conventional lens structure, the field angle on a diagonal from the screen at the wide-angle end was at best about 66°, and wide angles beyond about 66° have not been achieved. Furthermore, the conventional zoom lens has a problem in that the bigger the imaging element, the bigger the lenses included in the first lens group, causing the zoom lens in itself to be larger, and increasing the aberration.

With the foregoing in view, it is an object of the present invention to achieve smaller size, wider angle, and lower aberration in a four-group constitution zoom lens with a refractive power arrangement that is positive, negative, positive, and positive in order from the object side.

It is therefore an objective of the present invention to address at least in part the problems set forth above, and the invention be reduced to practice in the embodiments described below.

An aspect of the present invention provides a zoom lens, the zoom lens comprises a first lens group that has positive refractive power and is constituted by a plurality of lenses including at least one aspherical surface, and is arranged at the furthest object side; a second lens group that has negative refractive power and is arranged at the image side of the first lens group;

a third lens group that has positive refractive power and is arranged at the image side of the second lens group; and a fourth lens group that has positive refractive power and is arranged at the furthest image side; wherein the first lens group is, in order from the object side towards the image side, constituted by a first lens, a second lens and a plurality of lenses, wherein the first lens is a concave lens having concave surface that faces the image side, and the second lens is a meniscus lens having at least on surface formed in the shape of a meniscus.

With the zoom lens of the aspect of the present invention, the first lens group includes a plurality of lenses, and the second lens is an aspherical lens, thus not only enabling a wider field angle of 80° at high variable magnification of 10× or more, but also enabling the control of various kinds of aberration. In particular, it is able to provide high precision control of distortion over the entire range from the wide-angle end to the telephoto end, and of off-axis aberration at the telephoto end. Furthermore, the second lens is an aspherical meniscus lens, enabling miniaturization of the zoom lens.

These and other objects, features, aspects, and advantages of the invention will become more apparent from the following detailed description of the preferred embodiments with the accompanying drawings.

BRIEF DESCRIPTION OF THE DRAWINGS

FIG. 2 shows the surface data for each lens that structures the zoom lens 100 as set forth in the first embodiment FIG. 3 shows each value for the aspherical surface coefficients in the first embodiment.

FIG. 4 shows each value for the surface interval for the surfaces that are moved when changing the magnification, between the wide-angle end and the telephoto end in the first embodiment.

FIG. 5 shows the optical specifications in the first embodiment.

FIG. 13 shows the surface data for each lens structuring the zoom lens 100B as set forth in the second embodiment.

FIG. 14 shows each value for the aspherical surface coefficients in the second embodiment.

FIG. 15 shows each value for the surface interval for the surfaces that are moved when changing the magnification, between the wide-angle end and the telephoto end in the second embodiment.

FIG. 16 shows the optical specifications in the second embodiment.

FIGS. 20A through 20E show the transverse aberration at the wide-angle end in the second embodiment.

FIGS. 21A through 21E show the transverse aberration at a middle position between the wide-angle end and the telephoto end in the second embodiment.

FIGS. 22A through 22E show the transverse aberration at the telephoto end in the second embodiment.

FIG. 24 shows the surface data for each lens making up the zoom lens 100C as set forth in the third embodiment.

FIG. 25 shows each value for the aspherical surface coefficients in the third embodiment.

FIG. 26 shows each value for the surface interval for the surfaces that are moved when changing the magnification, between the wide-angle end and the telephoto end in the third embodiment.

FIG. 27 shows the optical specifications in the third embodiment.

FIGS. 31A through 31E show the transverse aberration at the wide-angle end in the third embodiment.

FIGS. 32A through 32E show the transverse aberration at a middle position between the wide-angle end and the telephoto end in the third embodiment.

FIGS. 33A through 33E show the transverse aberration at the telephoto end in the third embodiment.

DESCRIPTION OF THE PREFERRED EMBODIMENT

A. First embodiment

A-1. Zoom Lens Constitution

Figure 1:
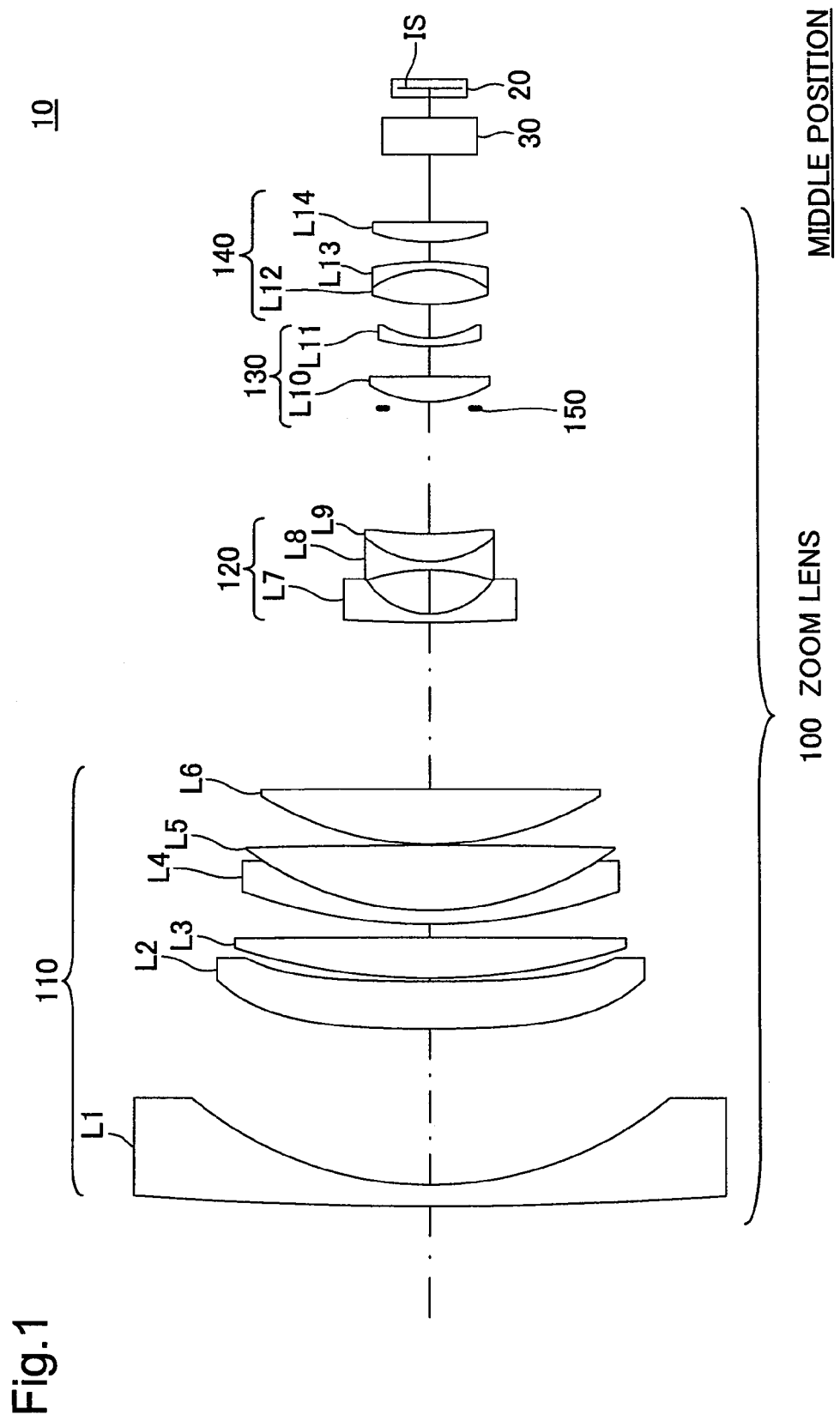
FIG. 1 shows the critical components of an imaging device 10 as set forth in a first embodiment.

FIG. 1 shows the main parts of an imaging device 10 of first embodiment. As shown in FIG. 1, the imaging device 10 is equipped with a zoom lens 100, a solid-state image sensing device 20 such as a CCD (charge coupled device) or the like which converts images taken by the zoom lens 100 to electric image signals, and an optical component 30 provided between the zoom lens 100 and the solid-state image sensing device 20. The optical component 30, for example, contains an optical filter, a solid state imaging component cover glass and the like. The solid-state image sensing device 20 has an image surface (imaging surface) IS.

The zoom lens 100 includes, in order from the object side, a first lens group 110 having an overall positive refractive power, a second lens group 120 having an overall negative refractive power that moves on the optical axis during changing magnification, a third lens group 130 having an overall positive refractive power, and a fourth lens group 140 having an overall positive refractive power that moves on the optical axis to correct the image surface position. The first lens group 110 and the third lens group 130 are fixed. An aperture 150 is provided between the second lens group 120 and the third lens group 130. By virtue of this constitution, the zoom lens 100 is a four-group, inner focus zoom type zoom lens. Zoom lens 100 has a variable power mechanism which changes magnification of zoom lens 100, moving the first lens group 110, the second lens group 120, the 1third lens group 130, the fourth lens group 140, and the aperture 150. A variable power mechanism is omitted in FIG. 1.

FIG. 1 shows the positional relationship of the various lens groups in the middle position, where, when zooming to the telephoto end, the second lens group 120 moves monotonically to the image side from the object side along the optical axis. The first lens group 110 and the third lens group 130 are stationary. The fourth lens group 140, when zooming to the telephoto end, moves along the optical axis. The fourth lens group 140 performs the focusing.

The first lens group 110 has a five-group/six-element lens configuration. A first lens L1 that is arranged at the furthest object side is a concave lens having concave surface that faces to the image side. A second lens L2, which is arranged second from the object side towards the image side, is a convex meniscus lens having spherical surfaces formed on both surfaces facing the object side and the image side. The aspherical surfaces of the second lens L2 are of a shape having minimal displacement in the thickness from the center portion to the edge portion, shaped so that the radius of curvature at the edge portion of the lens is less than the radius of curvature at the center portion of the lens, or in other words, is shaped so as to be steeper. Additionally, the second lens L2 is made of resin. A third lens L3 is a convex lens with the convex surface facing the object side. A fourth lens L4 is a concave meniscus lens, with the concave surface facing the image side, and a fifth lens L5 is a convex lens with the convex surface facing the object side. The fourth lens L4 and the fifth lens L5 are attached together to constitute a cemented lens. A sixth lens L6 is a convex lens with the convex surface facing the object side. In the first lens group 110, the second lens L2 need not necessarily be aspherical, and all that is necessary is for at least one surface within the surfaces included in the first lens group 110 to be aspherical. Moreover, at least one aspherical surface should be included within the first lens group 110, and the front group of the first lens group 110 should include an aspherical surface.

The first lens group 110 is structured so as to satisfy the following conditional equations (1) through (5). Here d0 is the thickness of the second lens on the optical axis; d is the thickness of the second lens in the normal direction at an arbitrary height from the optical axis in the effective radius of the surface of the image plane sign of the second lens; fi is the focal distance of the i-th lens when viewed from the object side; fw is the focal distance at the wide-angle end of the entire system; fG1 is the focal distance of the first lens group; and H1' is the distance from the apex of the final surface of the first lens 110 until the principal point on the backside of the first lens group 110.

$$0.55 < d/d0 < 1.1; \tag{1}$$

$$11 < |f2/fG1|; \tag{2}$$

$$-16.8 < f1/fw < -11.5; \tag{3}$$

$$-2.5 < f1/fG1 < -1.45; \text{ and} \tag{4}$$

$$0.13 < H1'/fG1 < 0.2. \tag{5}$$

Conditional equation (1) and (2) stipulate the shape of the second lens L2. Conditional equation (1) relates to the thickness on the optical axis in the lens L2, and to the thickness in the direction of the normal line at an arbitrary height within the effective radius. When the upper limit of 1.1 is exceeded, then the thickness of the lens edge portion is comparable to that in the vicinity of the optical axis, and thus the problem of shrinkage will occur during forming, making high precision manufacturing difficult.

Conditional equation (2) relates to the focal length of the second lens L2 and the first lens group 110. When the lower limit of 11 is exceeded then the power (refractive power) of the second lens L2 will be large, making it difficult to achieve a good balance in correcting the distortion and the astigmatism at the wide-angle end.

Conditional equations (3) and (4) relate to the focal length of the first lens L1. When the upper limits ("−11.5" in the conditional equation (3) or "−1.45" in conditional equation (4)) are exceeded, then the power of the first lens L1 will increase, disrupting the balance of the field curvature on the wide-angle end or the spherical aberration on the telephoto end, compromising performance. When the lower limits ("−16.8" in conditional equation (3) or "−2.5" in conditional equation (4)) are exceeded, this may lead to the total length or diameter of the lens becoming larger.

Conditional equation (5) relates to the location of the principal point on the backside of the first lens group 110 and to the focal length of the first lens group 110. It is possible to provide a lens system having a high variable magnification rate while still providing both an increased field angle of the zoom lens 100 and miniaturizing the diameter of the first lens L1 through stipulating the arrangement and refractive powers of each lens.

The zoom lens 100 in the first embodiment the first embodiment satisfies the conditional equations (1) through (5) given below:

$$d/d0 = 0.758 \quad (1)$$

$$|f2/fG1| = 18.6620 \quad (2)$$

$$f1/fw = -15.8368 \quad (3)$$

$$f1/fG1 = -1.9374 \text{ and} \quad (4)$$

$$H1'/fG1 = 0.1864. \quad (5)$$

A second lens group 120 comprises three lenses. A seventh lens L7, arranged at the object side, is a concave lens with the concave surface facing towards the image side. An eighth lens L8 is a biconcave lens, with both the surface facing the object side and the surface facing the image side being concave surfaces. A ninth lens L9, arranged at the furthest image side, is a convex meniscus lens with the convex surface facing the object side. The eighth lens L8 and the ninth lens L9 are joined together to constitute a cemented lens. However, the eighth lens L8 and the ninth lens L9 need not necessarily be joined together, and may be structured so as to be separate.

The third lens group 130 comprises two lenses. A 10th lens L10, arranged at the furthest object side, is a convex lens formed with aspherical surfaces on both sides, and a convex surface facing the object side. An 11th lens L11 is a concave meniscus lens with a concave surface facing the image side. The 10th lens L10 need not necessarily have aspherical surfaces on both surfaces, but instead only a single surface need be an aspherical surface.

The fourth lens group 140 comprises three lenses. A 12th lens L12, which is arranged at the furthest object side, is a biconvex lens that has a convex surface facing both the object side and the image side. A 13th lens L13 is a concave lens with a concave surface facing the object side. A 14th lens L14, as the final lens that is disposed furthest to the image side (the final lens in the entire zoom lens 100) is a biconvex lens. The 12th lens L12 and the 13th lens L13 are joined to constitute a cemented lens. The 12th lens L12 and the 13th lens L13 need not necessarily be joined, but instead may be structured so as to have an air distance between them.

With the zoom lens 100 as set forth in the first embodiment the first embodiment of the design described above, distortion can be suppressed effectively over the entire range from the wide-angle end to the telephoto end through the inclusion of at least one aspherical surface in the first lens group 110. Additionally, miniaturization of the zoom lens can be achieved through the use of the aspherical lens.

A-2. Lens Data

FIG. 2 shows surface data for each lens constituting the zoom lens 100 in the first embodiment the first embodiment. The surface number i indicates the number of the surface (lens surface) of each lens constituting the zoom lens 100. Note that the surface numbers 27 and 28 indicate the optical element 30. The radius of curvature Ri indicates the radius of curvature of the surface Si in millimeters. A convex surface facing the object side is represented by a positive value of the radius of curvature, and a concave surface facing the object side is indicated by a negative value for the radius of curvature.

The surface interval Di expresses by the distance, in millimeters, on the optical axis between the surface Si and the surface Si+1. That is, when the surface number i indicates a object side surface of a lens, the surface interval Di indicates the thickness of the lens on the optical axis, and when the surface number i indicates a surface on the image side of the lens, the surface interval Di indicates the distance on the optical axis between the image side surface of the lens and the object side surface of the next optical element (for example, the next lens).

The refractive index Ndi indicates the refractive index of the lens having the surface Si relative to the d ray (wavelength=587.6 nm).

The Abbe number vdi indicates the Abbe number of the lens having the surface Si. The Abbe number vdi is a value which indicates a property relating to the dispersion of the light in a lens, or the like, indicated by (nd−1)/(nF−nC), where the indices of refraction for the d ray, the C ray (wavelength=656.3 nm) and the F ray (wavelength=486.1 nm) are defined as nd, nC, and nF.

In FIG. 2, surfaces for which the surface numbers i are marked with asterisks have aspherical surface shapes. As described above, in the present embodiment, the surface S3 on the object side of the second lens L2 and the surface S4 on the image side of the second lens L2, along with the surface S18 on the object side of the 10th lens L10 and the surface S19 on the image side of the 10th lens L10 are formed in aspherical surface shapes. The aspherical surface shapes are represented by the following equation.

$$X = \frac{\frac{H^2}{R}}{1 + \sqrt{\left(1 - (1+K) \cdot \left(\frac{H}{R}\right)^2\right)}} + A4 \cdot H^4 + A6 \cdot H^6 + A8 \cdot H^8 + A10 \cdot H^{10} + A10 \cdot H^{12}$$

Here, when the intersection of the aspherical surface and the optical axis is defined as the origin, H indicates the distance from the origin in the direction that is perpendicular to the optical axis (the height from the optical axis). X indicates the distance from the origin on the optical axis. R indicates the radius of curvature, K indicates the conic coefficient (the conic constant), and A4, A6, A8, A10, and A12 indicate the high-order aspherical surface coefficients. The radius of curvature R is set as appropriate.

FIG. 3 shows values of the aspherical surface coefficients in the first embodiment the first embodiment. FIG. 3 shows the aspherical surface coefficients of each aspherical surface (surface S3, surface S4, surface S18, and surface S19). The respective values for the conical constant K and the high-order aspherical surface coefficients (the fourth-order, sixth-order, eighth-order, 10th-order, and 12th-order aspherical surface coefficients) A4, A6, A8, A10, and A12 are showed as the aspherical surface coefficients.

FIG. 4 shows each of the values of the intervals between surfaces for the movable surfaces when changing the magnification from the wide-angle end to the telephoto end in the first embodiment. In the first embodiment, the movable surfaces are the respective surfaces of surface numbers 11, 16, 21, and 26, where FIG. 4 shows the respective values of the intervals between surfaces D11, D16, D21, and D26. As showed in FIG. 4, the zoom lens 100 can be placed in the state on the wide-angle end by setting the surface interval D11, which corresponds to the distance on the optical axis between the first lens group 110 and the second lens group 120, to 0.700; setting the surface interval D16, which corresponds to the distance on the optical axis between the second lens group 120 and an aperture 150, to 26.713; setting the surface interval D21, which corresponds to the distance on the optical axis between the aperture 150 and the third lens group 130, to 6.203; and setting the surface interval D26, which corresponds to the distance on the optical axis between the third lens group 130 and the fourth lens group 140, to 3.358. Similarly, the zoom lens 100 can be placed in a middle position state between the wide-angle end and the telephoto end, or in a state at the telephoto end, by setting the intervals between surfaces D11, D16, D21, and D26 to the values indicated in FIG. 4.

FIG. 5 shows the optical specifications in the first embodiment. As showed in FIG. 5, at the wide-angle end, the focal length=3.74, the field angle 2ω=83.20°, and the F number=1.85; at the middle position, the focal length=12.22, the field angle 2ω=27.36°, and the F number=2.31; and at the telephoto end, the focal length=40.05, the field angle 2ω=8.59°, and the F number=2.80. In this way, the zoom lens 100 of the first embodiment can provide a wide field angle of 83.20° at the wide-angle end.

A-3. Zoom Lens Characteristics

Figure 6:
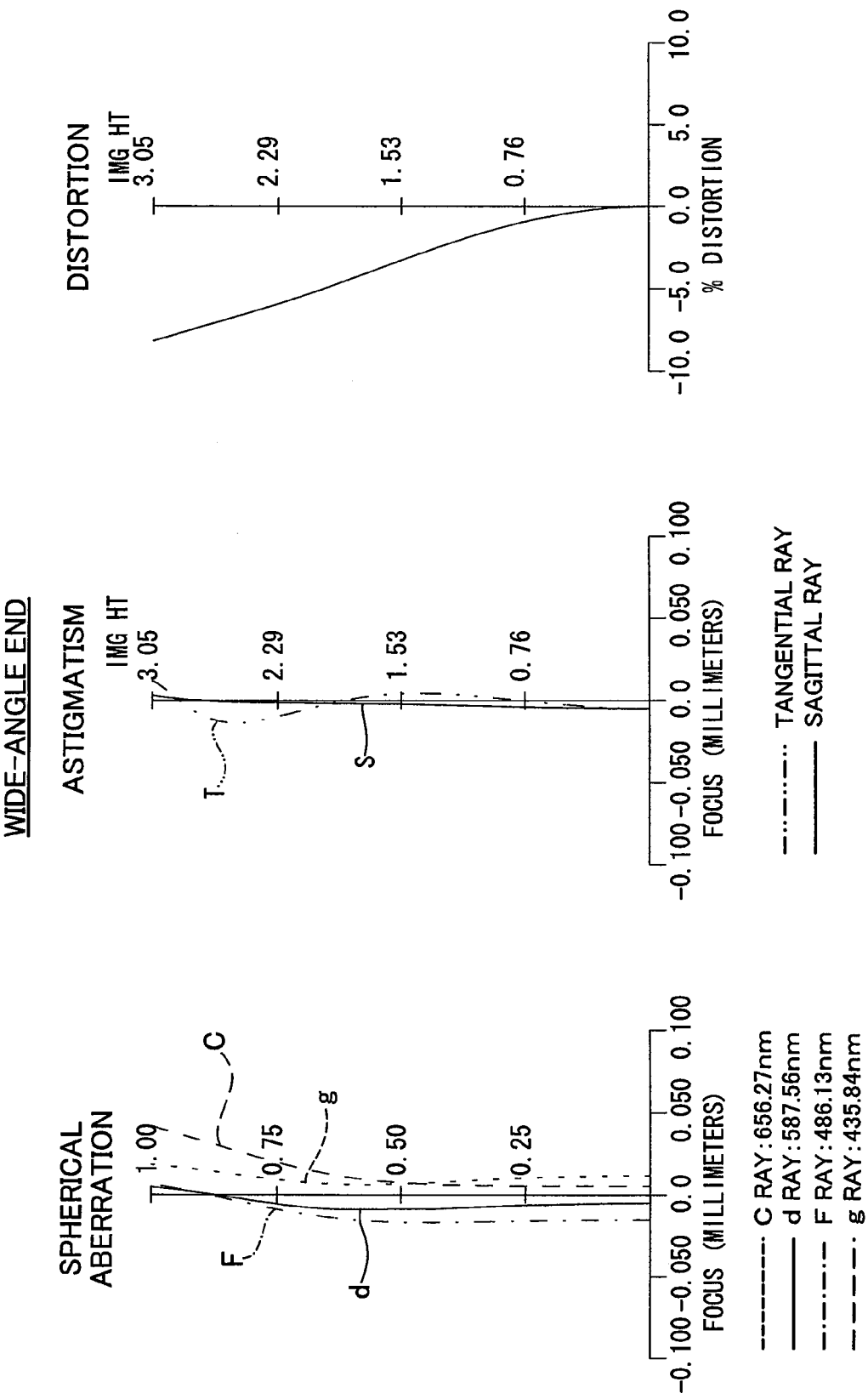
FIG. 6 shows the aberration characteristics at the wide-angle end in the first embodiment.
Figure 7:
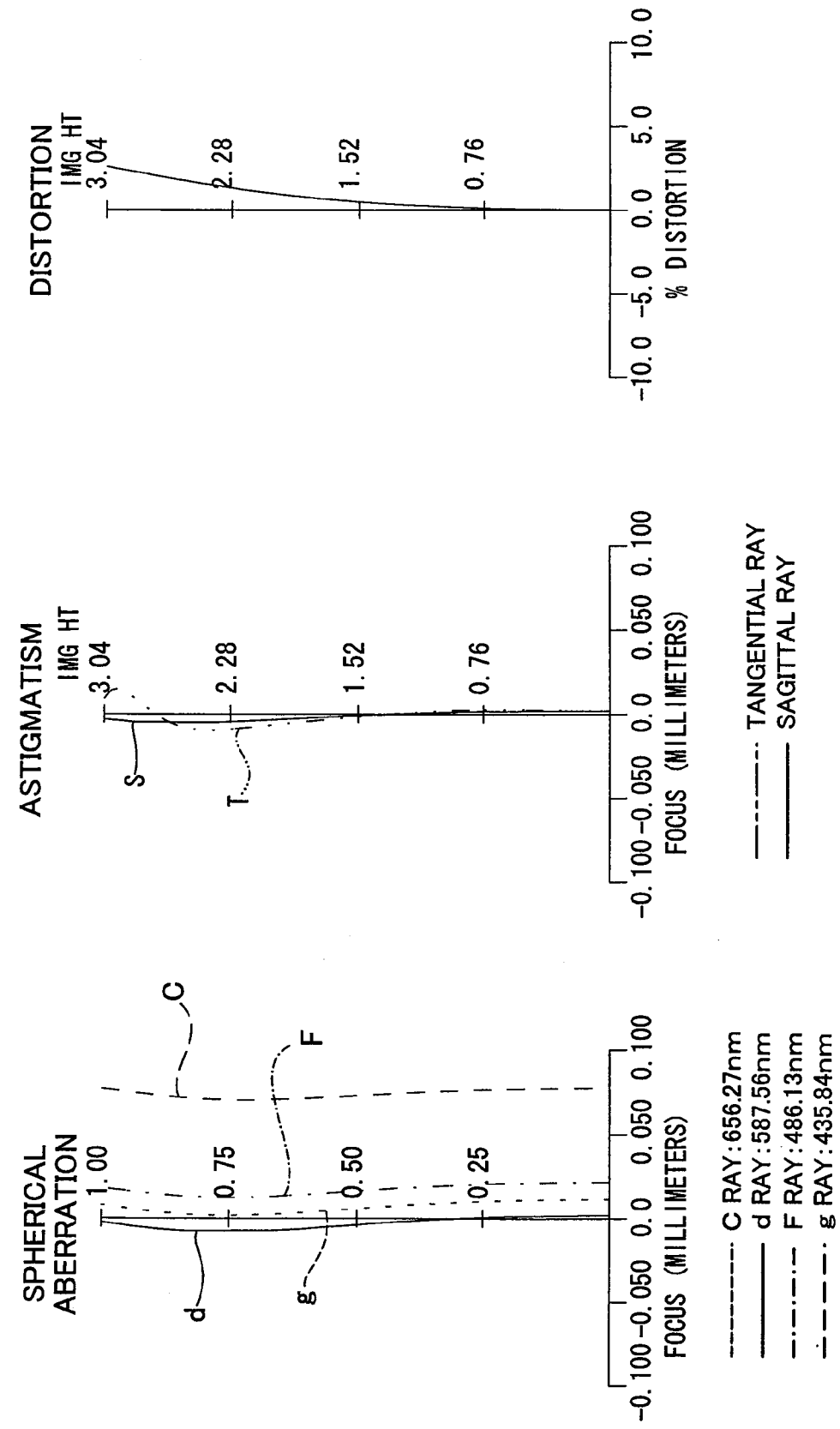
FIG. 7 shows the aberration characteristics at a middle position between the wide-angle end and the telephoto end in the first embodiment.
Figure 8:
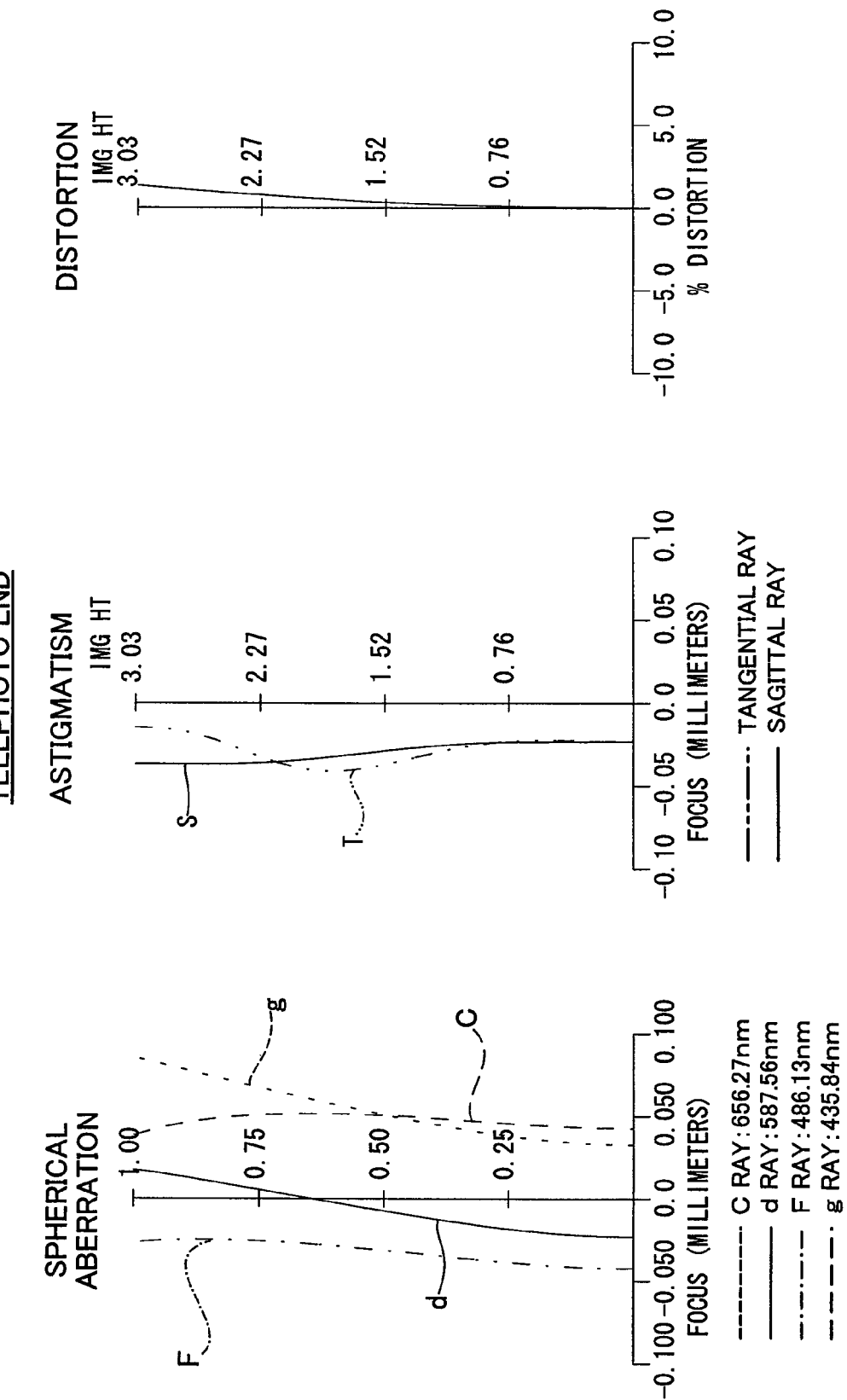
FIG. 8 shows the aberration characteristics at the telephoto end in the first embodiment.
Figure 9:
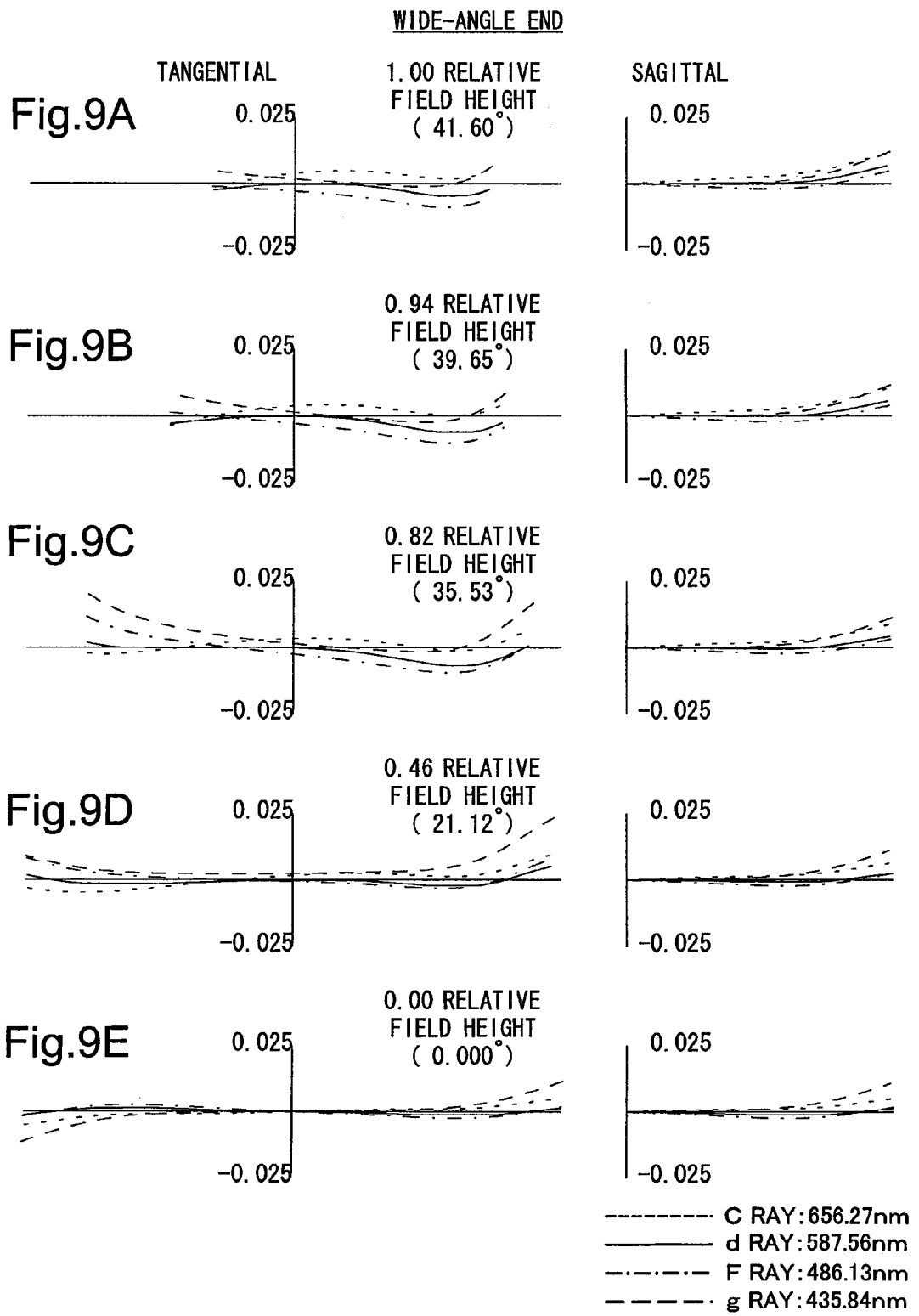
FIGS. 9A through 9E show the transverse aberration at the wide-angle end in the first embodiment.
Figure 10:
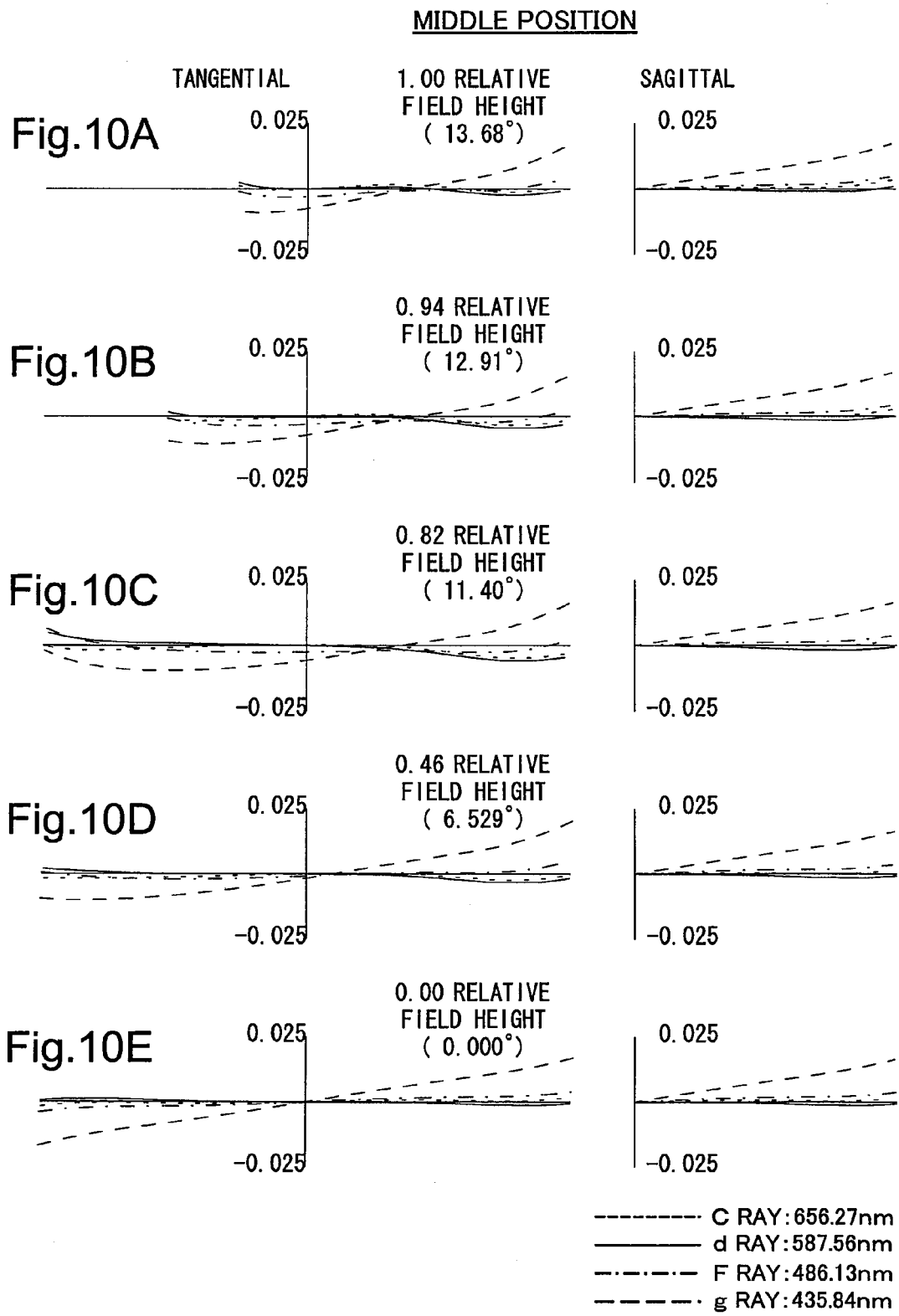
FIGS. 10A through 10E show the transverse aberration at a middle position between the wide-angle end and the telephoto end in the first embodiment.
Figure 11:
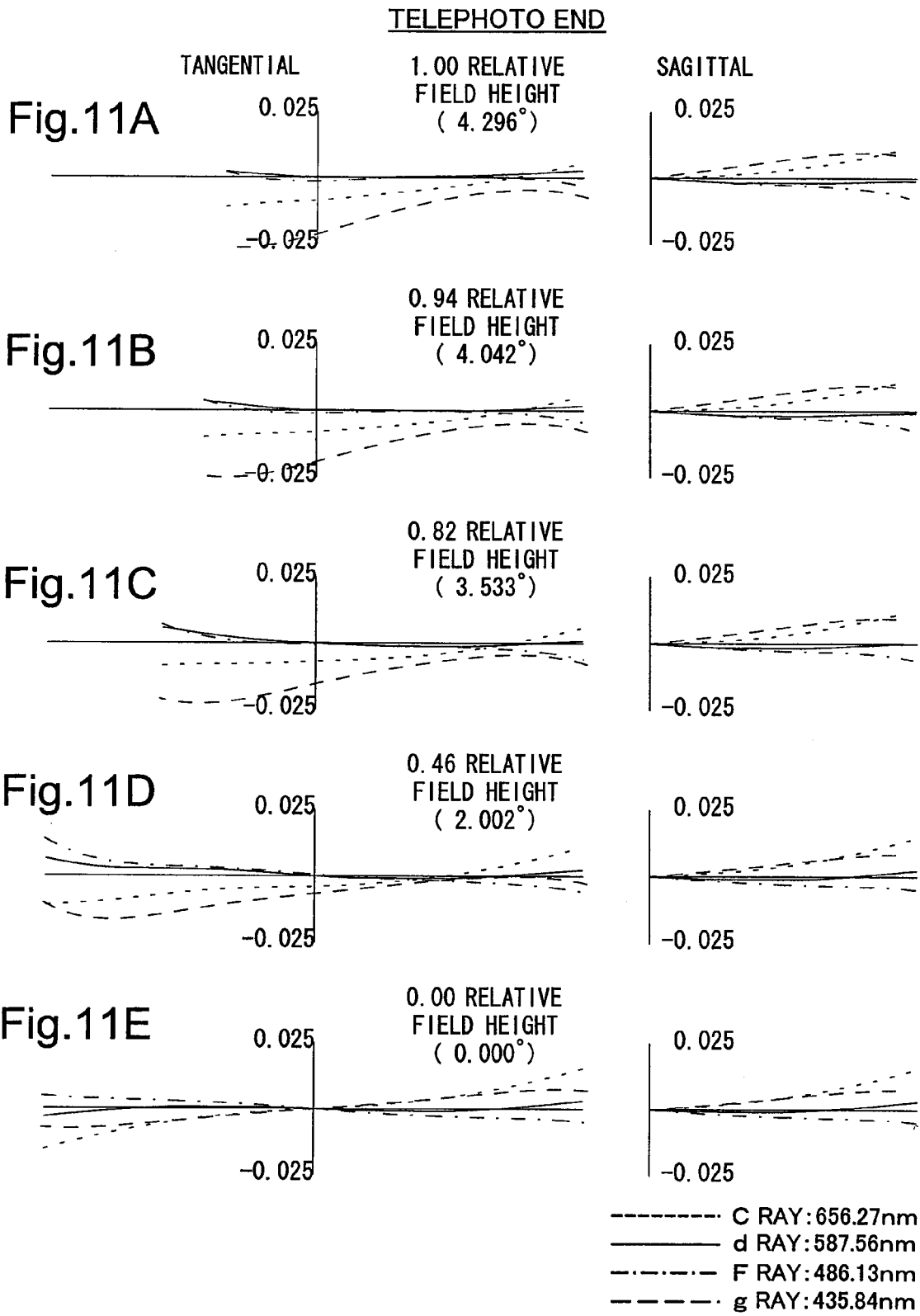
FIGS. 11A through 11E show the transverse aberration at the telephoto end in the first embodiment.

The aberration characteristics of the zoom lens 100 in the first embodiment having the structure described above are showed in FIG. 6 through FIG. 8. FIG. 6 shows the aberration characteristics at the wide-angle end in the first embodiment. FIG. 7 shows the aberration characteristics at middle position between the wide-angle end and the telephoto end in the first embodiment. FIG. 8 shows the aberration characteristics at the telephoto end in the first embodiment. FIG. 9A through 9E show the transverse aberration at the wide-angle end in the first embodiment. FIG. 10A through 10E shows the transverse aberration at middle position between wide-angle end and the telephoto end in the first embodiment. FIG. 11A through 11E shows the transverse aberration at the telephoto end in the first embodiment. Transverse aberration is aberration on the image plane, and includes coma aberration, and chromatic aberration of magnification, and so forth.

In FIG. 6 through FIG. 8, the graph on the left side indicates the amount of the spherical aberration, the graph in the middle indicates the amount of the astigmatism relative to the direction of height of the imaging plane, and the graph on the right indicates the distortion relative to the direction of height of the imaging plane. The symbols C, d, F, and g in the graphs showing the spherical aberration in FIG. 6 indicate the different wavelengths of the rays used in calculating the respective aberrations (where the C ray has a wavelength of 656.27 nm, the d ray has a wavelength of 587.56 nm, the F ray has a wavelength of 486.13 nm, and the g ray has a wavelength of 435.84 nm), where the symbol T (the double dotted line) in the graph indicating the astigmatism in FIG. 6 shows the characteristics a tangential ray, and S (the solid line) is for the sagittal ray. The same is true for FIG. 7 and FIG. 8 thereafter. FIG. 6 through FIG. 11E are the results of simulations.

As showed in FIG. 6 through FIG. 8, while the zoom lens 100 in the first embodiment has a high variable magnification that is 10× that of a conventional lens, the aberration characteristic, when compared to that of a conventional zoom lens, has improved distortion from at the wide-angle end to the telephoto end. In particular, the lens is able to correct off-axis aberration at the telephoto end able to control a variety of types of aberrations across the entire range of zooming. Thus this enables capturing of a high quality image across the entire range of zooming.

FIG. 9A through 9E, respectively, show transverse aberration when the incident angles of the rays that are incident into the zoom lens 100 are 41.60°, 39.65°, 35.53°, 21.12°, and 0.00°. In FIG. 9A through 9E the graphs with the dotted lines show the transverse aberration when using the C ray. The graphs with the solid lines show the transverse aberration when using the d ray. The graphs with the dashed lines show the transverse aberration when using the F ray. The graphs with the long dashed lines show the transverse aberration when using the g ray. The figures on the left side in FIG. 9A through 9E show the transverse aberration in the tangential plane, and the figures on the right side show the transverse aberration in the sagittal plane. For the transverse aberration in the sagittal plane, the illustration is simplified because of the symmetry around the longitudinal axis.

The transverse axis indicates the position, in the aperture plane, of the various light rays that constitute the bundle of rays. For example, the origin shows the principal light ray, and the point that is furthest from the origin indicates the light ray that is furthest towards the outside of the bundle of rays on the plane of the aperture. The longitudinal axis indicates the distance, in millimeters, between a reference point in the form of the image plane IS and the intersections between the image plane IS and each of the rays that constitute the bundle of rays. Here the reference point is the point of intersection between image plane IS and the principal ray at a wavelength of 587.56 nm.

FIG. 10A through 10E respectively show the transverse aberration when the incident angles of the rays that are incident into the zoom lens 100 are 13.68°, 12.91°, 11.40°, 6.529°, and 0.00°. In FIG. 10A through 10E, the graphs with the dotted lines show the transverse aberration when using the C ray. The graphs with the solid lines show the transverse aberration when using the d ray. The graphs with the dashed lines show the transverse aberration when using the F ray. The graphs with the long dashed lines show the transverse aberration when using the g ray.

FIG. 11A through 11E respectively show the transverse aberration when the incident angles of the rays that are incident into the zoom lens 100 are 4.296°, 4.042°, 3.533°, 2.002°, and in 0.00° In FIG. 11A through 11E, the graphs with the dotted lines show the transverse aberration when using the C ray. The graphs with the solid lines show the transverse aberration when using the d ray. The graphs with the dashed lines show the transverse aberration when using the F ray. The graphs with the long dashed lines show the transverse aberration when using the g ray.

As described above, because the point of intersection of the image plane IS and the principal ray at a wavelength of 587.56 nm is set as the reference point, the graphs with the solid lines pass through the origin in each of the states from the wide-angle end through the telephoto end. As shown in FIG. 9A through 9E, the amount of shift from the reference point when each of the individual wavelengths is used and when the d ray is used as the reference and when at the wide-angle end are: no more than the 0.0039 mm for the C ray, no more than 0.0029 mm for the F ray, and no more than 0.0023 mm for the g ray; as shown in FIG. 10A through 10E, at the middle position, they are no more than the 0.0003 mm for the C ray, no more than 0.0030 mm for the F ray, and no more than 0.0075 mm for the g ray; and as shown in FIG. 11A through 11E, at the telephoto end they are no more than the 0.0086 mm for the C ray, no more than 0.0014 mm for the F ray, and no more than 0.0214 mm for the g ray.

The zoom lens 100 according to the first embodiment described above, enables a broad field angle in excess of about 80° at the wide-angle end with a high variable magnification in excess of 10×. Moreover, by made the aspherical lens that is included in the first lens group 110 of resin, costs can be kept lower in comparison with fabrication from glass. Furthermore, the lens shape of the aspherical lens is a shape having little displacement of the thickness from the center portion to the edge portion, and wherein the radius of curvature at the lens edge portion is steeper than the radius of curvature at the lens center portion enables the effective correction of distortion and off-axis aberration at the wide angle side. Consequently, the first embodiment is able to provide a high-performance zoom lens that is small with a high variable magnification.

B. Second Embodiment

B-1. Zoom Lens Constitution

Figure 12:
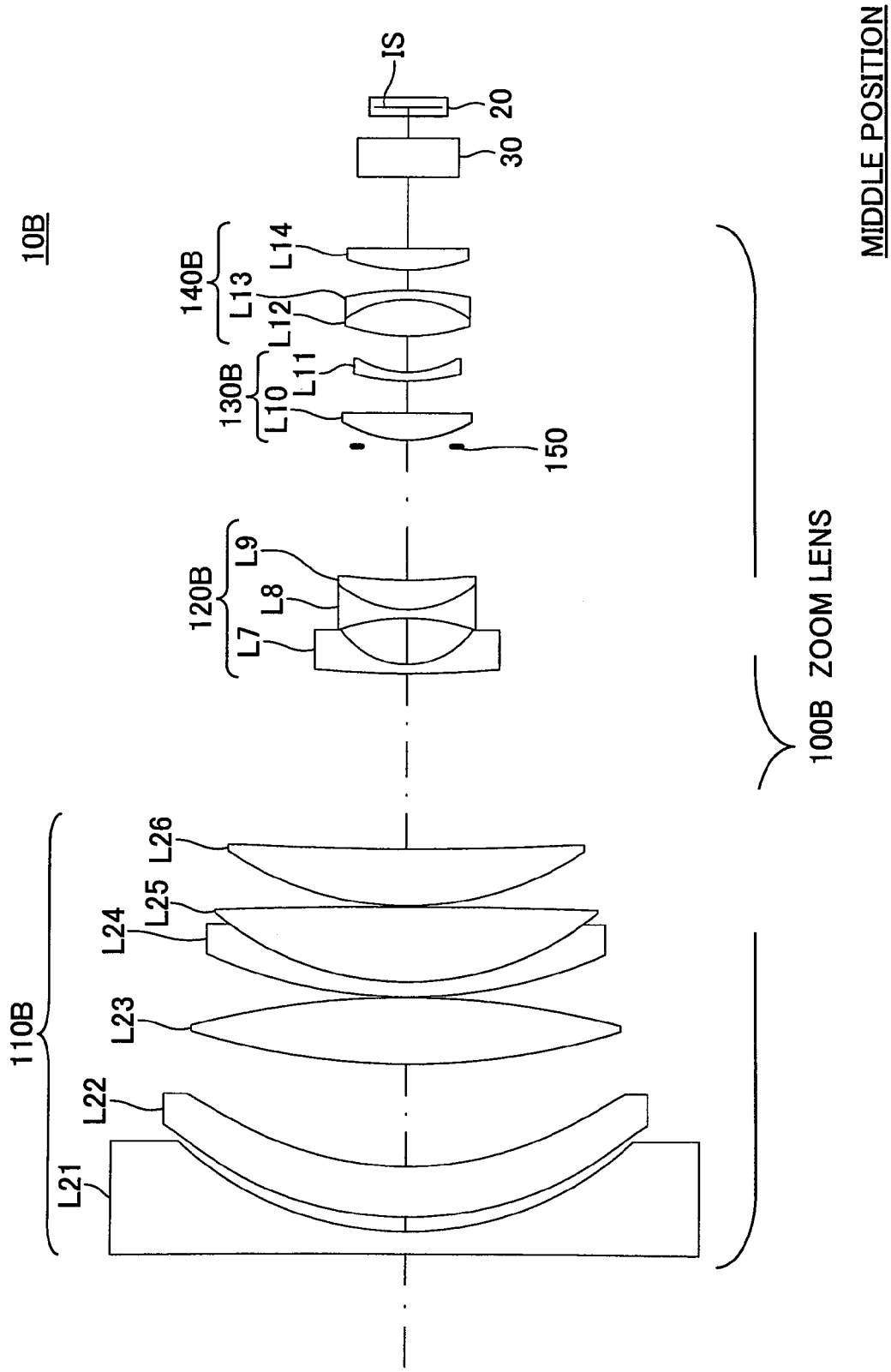
FIG. 12 shows the critical components of an imaging device 10B as set forth in a second embodiment.

FIG. 12 shows the principal components of an imaging device 10B in second embodiment. Except for the zoom lens 100B, the imaging device 10B has essentially the identical structure as the imaging device 10 in the first embodiment.

The zoom lens 100B includes, in order from the object side, a stationary first lens group 110B having positive refractive power; a second lens group 120B, having negative refractive power and that moves on the optical axis when changing the magnification; a stationary third lens group 130B that has positive refractive power; a fourth lens group 140B, having positive refractive power and that moves on the optical axis in order to correct the position of the image plane; and an aperture 150.

The first lens group 110B has a five-group/six-element lens configuration. A first lens L21 that is arranged at the furthest object side is a concave lens wherein the concave surface faces the image side. A second lens L22, which is arranged second from the object side towards the image side, is a convex meniscus lens wherein the convex surface, which is formed into an aspherical surface, faces toward the object side. A third lens L23 is a biconvex lens with convex surfaces facing both the object side and the image side. A fourth lens L24 is a concave meniscus lens, with the concave surface facing the image side, and a fifth lens L25 is a convex lens with the convex surface facing the object side. The fourth lens L24 and the fifth lens L25 are attached together to constitute a cemented lens. A sixth lens L26 is a convex lens with the convex surface facing the object side. In the first lens group 110B, both surfaces of the second lens L22 need not necessarily be aspherical, and all that is necessary is for at least one surface within the surfaces included in the first lens group 110B to be aspherical.

As with the first embodiment, the second lens L22 is of a shape wherein there is little displacement in the thickness from the center portion to the edge portion, shaped so that the radius of curvature at the edge portion of the lens is steeper than the radius of curvature at the center portion of the lens on the object side and shallower on the image side to form an aspherical surface shape, and is made of resin.

The first lens group 110B, in regards to the conditional equations (1) through (5) described in the first embodiment, fulfills the conditional equations as indicated below:

$$d/d0=0.765 \quad (1)$$

$$|f2/fG1|=40.4168 \quad (2)$$

$$f1/fw=-12.1795 \quad (3)$$

$$f1/fG1=-1.4837 \text{ and} \quad (4)$$

$$H1'/fG1=0.1923. \quad (5)$$

The second lens group 120B, the third lens group 130B, and the fourth lens group 140B are structured identically to those in the first embodiment.

B-2. Lens Data

FIG. 13 shows surface data for each lens constituting the zoom lens 100B in the second embodiment. FIG. 13 corresponds to FIG. 2 explaining the first embodiment. As with the first embodiment, in the second embodiment the surface S3 on the object side of the second lens L22 and the surface S4 on the image side of the second lens L22 along with the surface S18 on the object side of the 10th lens L10 and the surface S19 on the image side of the 10th lens L10 form aspherical surface shapes. FIG. 14 corresponds to FIG. 3 explained in the first embodiment. FIG. 15 shows the respective values of the intervals between surfaces D11, D16, D21, and D26 for the surfaces that move when changing the magnification between the wide-angle end and the telephoto end (the surfaces of surface numbers 11, 16, 21, and 26) in the second embodiment. FIG. 15 corresponds to FIG. 4 in the first embodiment.

As showed in FIG. 15, the surface interval D11, corresponding to the distance between the first lens group 110B and the second lens group 120B, the surface interval D16, corresponding to the distance between the second lens group 120B and the aperture 150, the surface interval D21, corresponding to the distance between the aperture 150 and the third lens group 130B, and the distance D26 between the third lens group 130B and the fourth lens group 140B in the respective states on the wide-angle end and the telephoto end are the same as in the first embodiment. This structure enables the zoom lens 100B to be in a wide-angle end state, a middle position state between the wide-angle end and the telephoto end, and a telephoto end state.

FIG. 16 shows the optical specifications in the second embodiment. As is showed in FIG. 16, on the wide-angle end, the focal length=3.70, the field angle 2ω=81.18°, and the F number=1.85, in the middle position, the focal length=12.12, the field angle 2ω=27.14°, and the F number=2.31, and on the telephoto end, the focal length=39.95, the field angle 2ω=8.60°, and the F number=2.80. In this way, the zoom lens 100B in the second embodiment can provide a wide field angle of 81.18° on the wide-angle end.

B-3. Zoom Lens Characteristics

FIG. 17 through FIG. 22E are explanatory diagrams showing the aberration characteristics of the zoom lens 100B. FIG.

17 shows the aberration characteristics when at the wide-angle end in the second embodiment. FIG. 18 shows the aberration characteristics at middle position between the wide-angle end and the telephoto end in the second embodiment. FIG. 19 shows the aberration characteristics when at the telephoto end in the second embodiment. FIG. 20A through 20E show the transverse aberration when at the wide-angle end in the second embodiment. FIG. 21A through 21E show the transverse aberration at middle position between wide-angle end and the telephoto end in the second embodiment. FIG. 22A through 22E show the transverse aberration when at the telephoto end in the second embodiment. FIG. 17 through FIG. 22E correspond, respectively, to FIG. 6 through FIG. 11E in the first embodiment.

Figure 17:
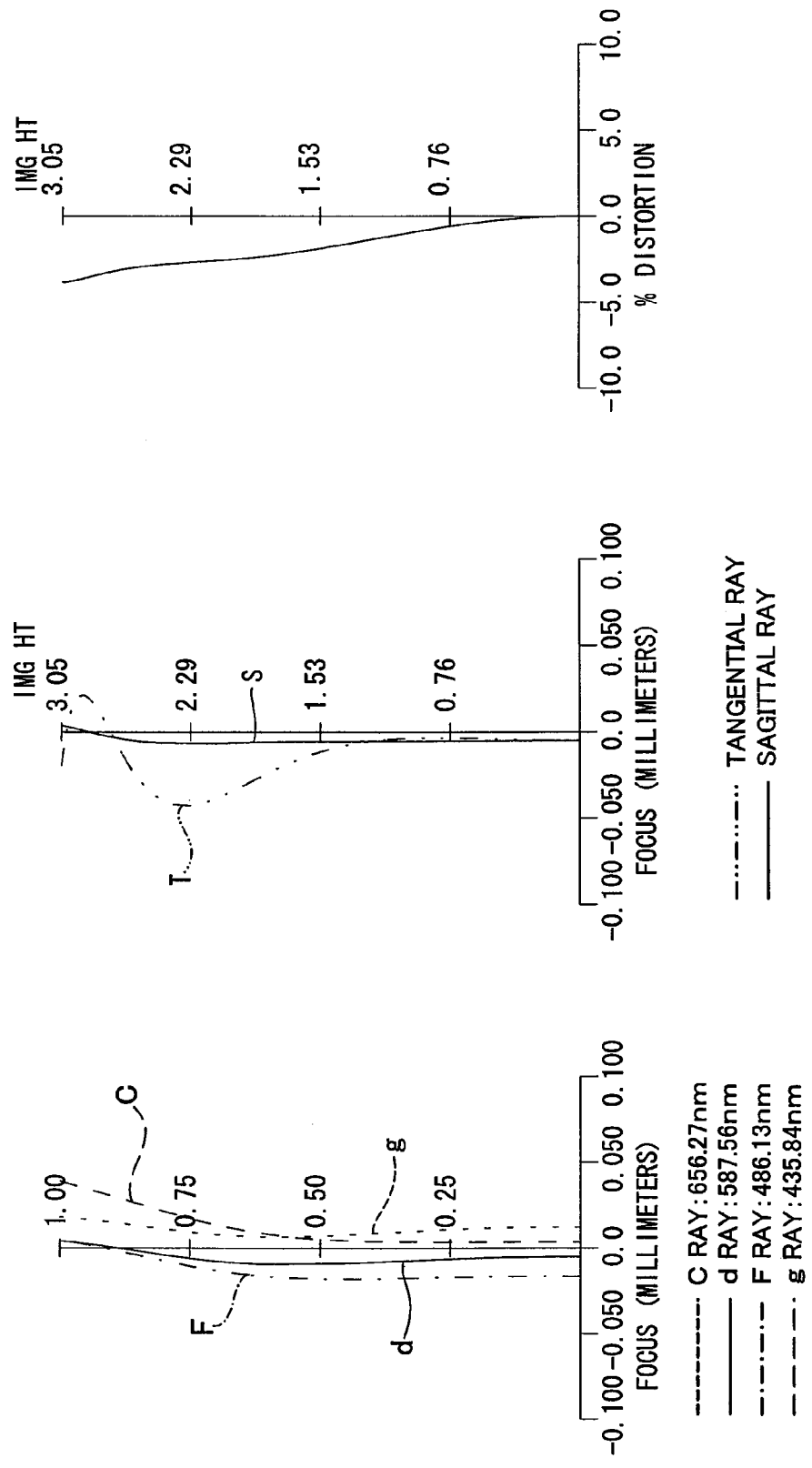
FIG. 17 shows the aberration characteristics at the wide-angle end in the second embodiment.
Figure 18:
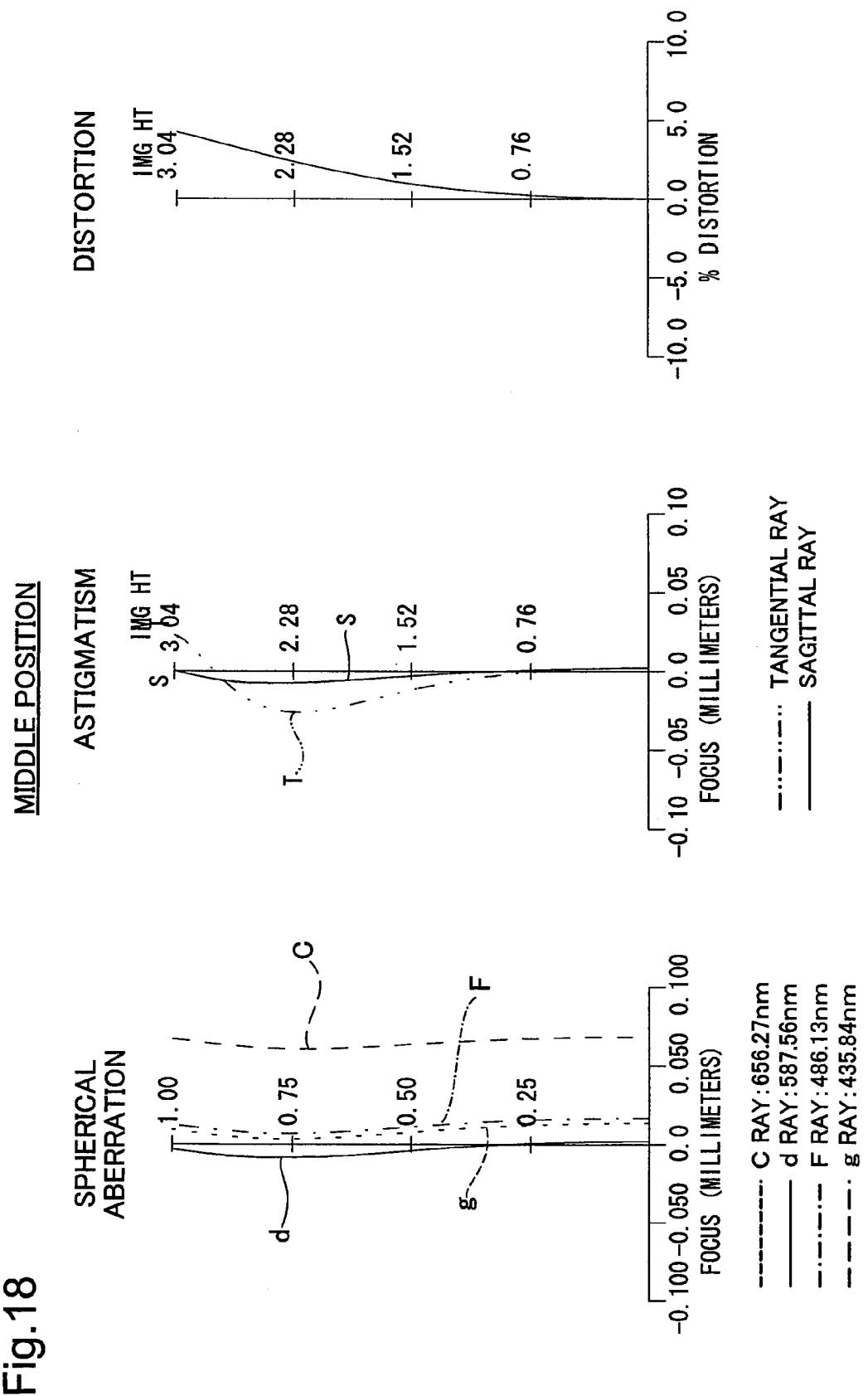
FIG. 18 shows the aberration characteristics at a middle position between the wide-angle end and the telephoto end in the second embodiment.
Figure 19:
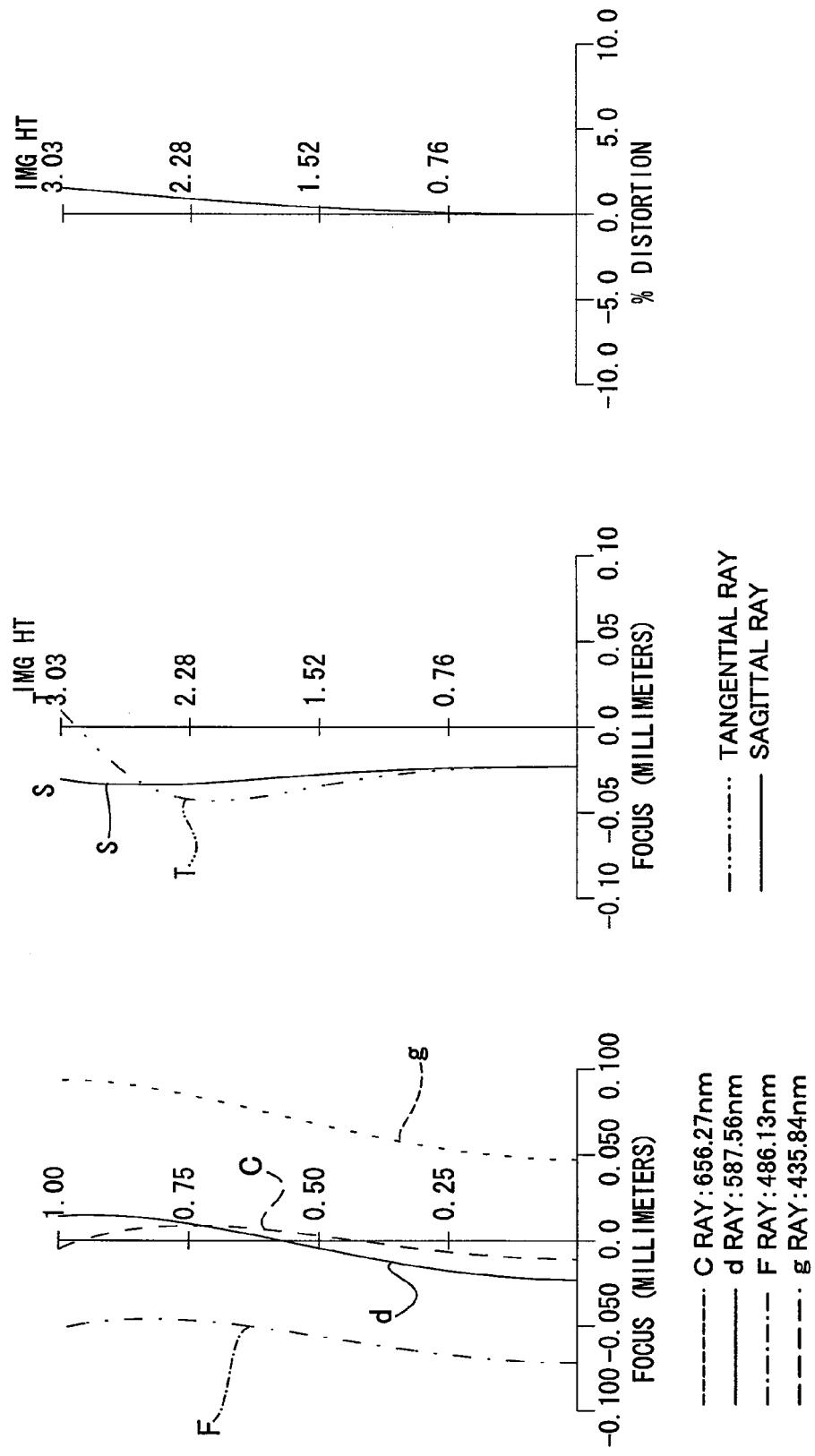
FIG. 19 shows the aberration characteristics at the telephoto end in the second embodiment.

As showed in FIG. 17 through FIG. 19, whereas the zoom lens 100B in the second embodiment has a high variable magnification that is 10×, as was the case with the zoom lens 100100 according to the first embodiment, the spherical aberration, astigmatism, and distortion are improved over the range of the wide-angle end through the telephoto end.

FIG. 20A through 20E, respectively, show transverse aberration when the incident angles of the rays that are incident into the zoom lens 100B are 40.59°, 38.71°, 34.76°, 21.09°, and 0.00°. FIG. 21A through 21E, respectively, show transverse aberration when the incident angles of the rays that are incident into the zoom lens 100B are 13.58°, 13.00°, 11.32°, 6.557°, and 0.00°. FIG. 22A through 22E, respectively, show transverse aberration when the incident angles of the rays that are incident into the zoom lens 100B are 4.299°, 4.045°, 3.537°, 2.006°, and 0.00°.

With regard to the amount of shift from the reference point when each of the individual wavelengths is used, in the respective states from the wide-angle side to the telephoto side when the d ray is used as the reference, as shown in FIG. 20A through 20E at the wide-angle end they are no more than the 0.0050 mm for the C ray, no more than 0.0047 mm for the F ray, and no more than 0.0026 mm for the g ray; as shown in FIG. 21A through 21E at the middle position they are no more than the 0.0017 mm for the C ray, no more than 0.0056 mm for the F ray, and no more than 0.0143 mm for the g ray; and as shown in FIG. 22A through 22E at the telephoto end they are no more than the 0.0088 mm for the C ray, no more than 0.0026 mm for the F ray, and no more than 0.0211 mm for the g ray.

The provision of the structure characterized as described above not only enables a wide field angle in excess of 80° at the wide-angle end, with a high variable magnification in excess of 10× for the zoom lens 100B according to the second embodiment, but also enables the provision of a small zoom lens with excellent performance, that suppresses various types of aberration in the respective states from the wide-angle end through the telephoto end.

C. Third Embodiment

C-1. Zoom Lens Constitution

Figure 23:
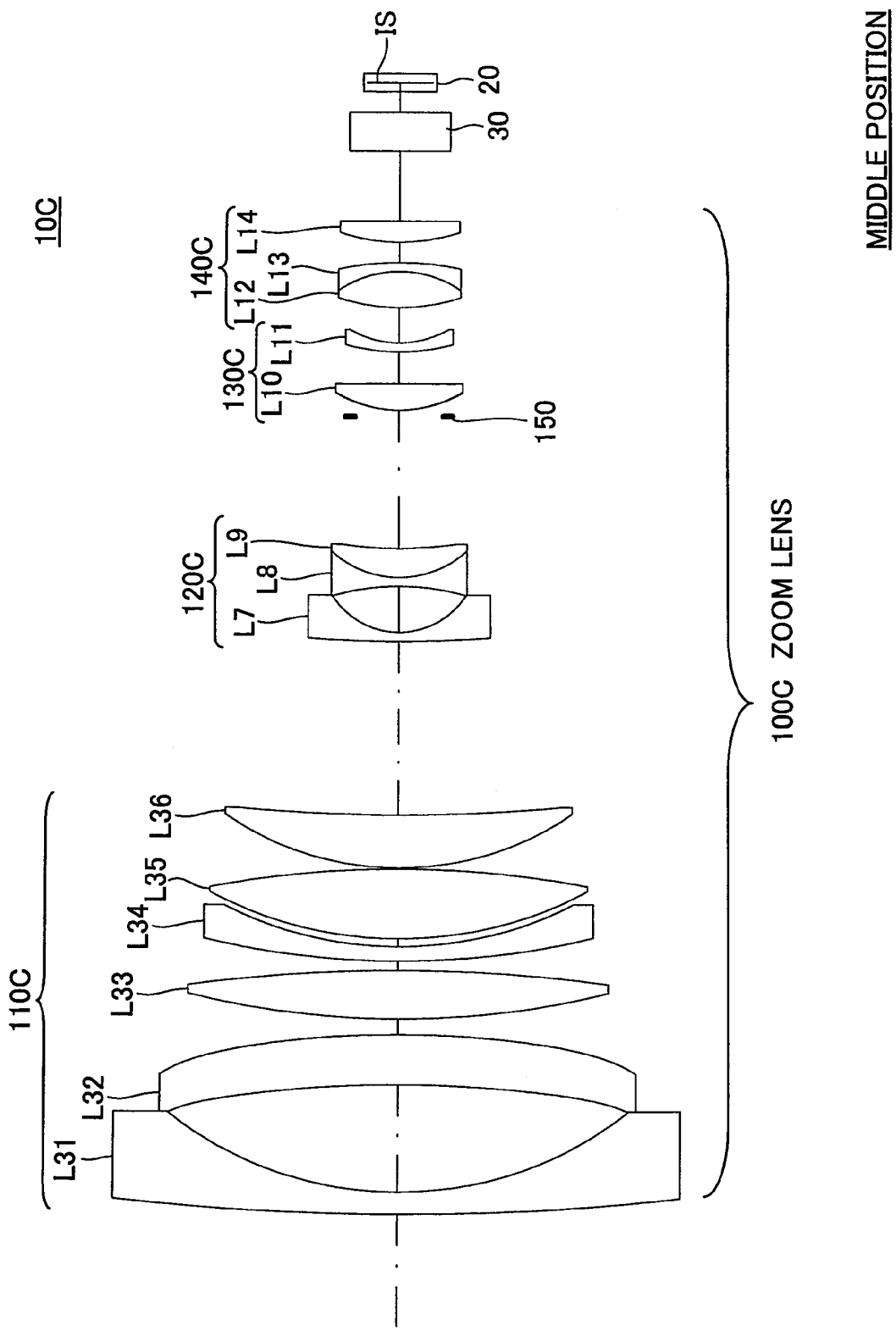
FIG. 23 shows the principal components of an imaging device 10C as set forth in a third embodiment.

FIG. 23 shows the critical components of an imaging device 10C in a third embodiment. Except for the zoom lens 100C, the imaging device 10C has essentially the identical structure as the imaging device 10 in the first embodiment.

The zoom lens 100C comprises, sequentially from the object side, a stationary first lens group 110C having positive refractive power; a second lens group 120C, having negative refractive power and that moves on the optical axis when changing the magnification; a stationary third lens group 130C that has positive refractive power; a fourth lens group 140C, having positive refractive power, and that moves on the optical axis in order to correct the position of the image plane; and an aperture 150.

The first lens group 110C, rather than having the five-group, six lens arrangement of First and second Embodiments, comprises six lenses. A first lens L31 that is arranged at the furthest object side is a concave lens wherein the concave surface faces the image side. A second lens L32, which is arranged second from the object side towards the image side, is a convex meniscus lens wherein the convex surface, which is formed into an aspherical surface, faces toward the object side. A third lens L33 is a biconvex lens with convex surfaces facing both the object side and the image side. A fourth lens L34 is a concave meniscus lens, with the concave surface facing the image side. A fifth lens L35 is a biconvex lens with convex surfaces facing both the object side and the image side. The fourth lens L34 and the fifth lens L35 are not attached together. A sixth lens L36 is a convex lens with the convex surface facing the object side. In the first lens group 110C, both surfaces of the second lens L32 need not necessarily be aspherical, and all that is necessary is for at least one surface within the surfaces included in the first lens group 110C to be aspherical.

As in First and second Embodiments, the second lens L32 is of a shape wherein there is little displacement in the thickness from the center portion to the edge portion, shaped so that the radius of curvature at the edge portion of the lens is steeper than the radius of curvature at the center portion of the lens, and is formed in an aspherical surface shape, and is made of resin.

The first lens group 110C, in regards to the conditional equations (1) through (5) described in the first embodiment, fulfills the conditional equations as indicated below:

$$d/d0 = 0.835 \tag{1}$$

$$|f2/fG1| = 35.9611 \tag{2}$$

$$f1/fw = -15.8336 \tag{3}$$

$$f1/fG1 = -1.9493 \text{ and} \tag{4}$$

$$H1'/fG1 = 0.1787. \tag{5}$$

The second lens group 120C, the third lens group 130C, and the fourth lens group 140C are structured identically to those in the first embodiment.

C-2. Lens Data

FIG. 24 shows surface data for each lens constituting the zoom lens 100C in the third embodiment the third embodiment. FIG. 24 corresponds to FIG. 2, explained in the first embodiment. In the third embodiment, the surface S3 on the object side of the second lens L32 and the surface S4 on the image side of the second lens L32, along with the surface S19 on the object side of the 10th lens and the surface S20 on the image side of the 10th lens, are formed in aspherical surface shapes. FIG. 25 shows the aspherical surface coefficients for the surfaces S3, S4, S19, and S20 in the third embodiment. FIG. 26 shows the respective values of the intervals between surfaces D12, D17, D22, and D27 for the surfaces that move when changing the magnification between the wide-angle end and the telephoto end (the surfaces of surface numbers 12, 17, 22, and 27) in the third embodiment. FIG. 26 corresponds to FIG. 4 in the first embodiment.

As showed in FIG. 26, the surface interval D11, corresponding to the distance between the first lens group 110C and the second lens group 120C, the surface interval D16, corresponding to the distance between the second lens group 120C and the aperture 150, the surface interval D21, corresponding to the distance between the aperture 150 and the third lens group 130C, and the distance D26 between the third lens group 130C and the fourth lens group 140C, are the distances in the respective states on the wide-angle end and the telephoto end. This structure enables the zoom lens 100C to be in a wide-angle end state, a middle position state between the wide-angle end and the telephoto end, and a telephoto end state.

FIG. 27 shows the optical specifications in the third embodiment. As showed in FIG. 27, on the wide-angle end, the focal length=3.80, the field angle 2ω=79.64°, and the F number=1.85, in the middle position, the focal length=12.34, the field angle 2ω=26.84°, and the F number=2.31, and on the telephoto end, the focal length=40.00, the field angle 2ω=8.59°, and the F number=2.81. In this way, the zoom lens 100C in the third embodiment can provide a wide field angle of 79.64° on the wide-angle end.

C-3. Zoom Lens Characteristics

Figure 28:
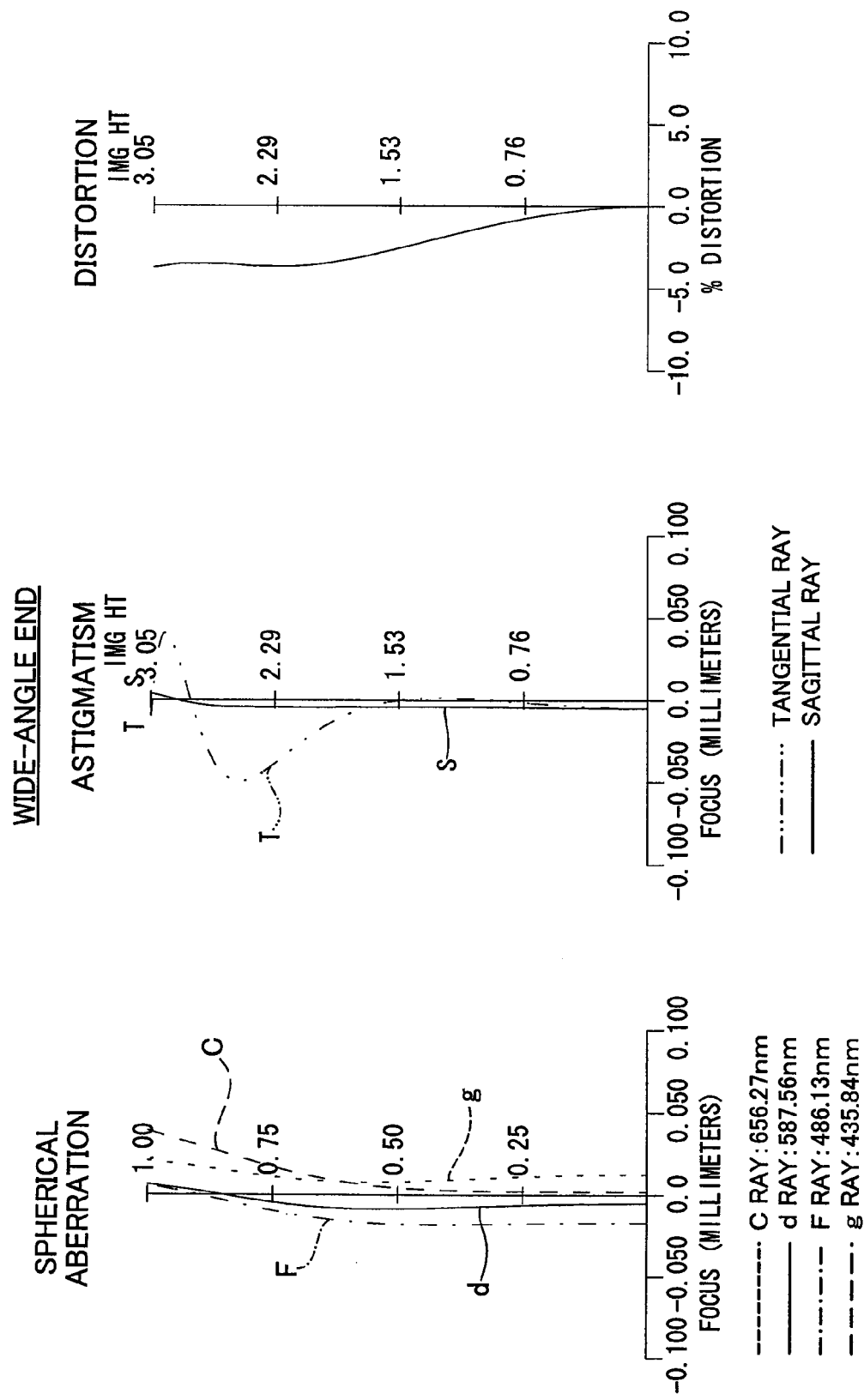
FIG. 28 shows the aberration characteristics at the wide-angle end in the third embodiment.
Figure 29:
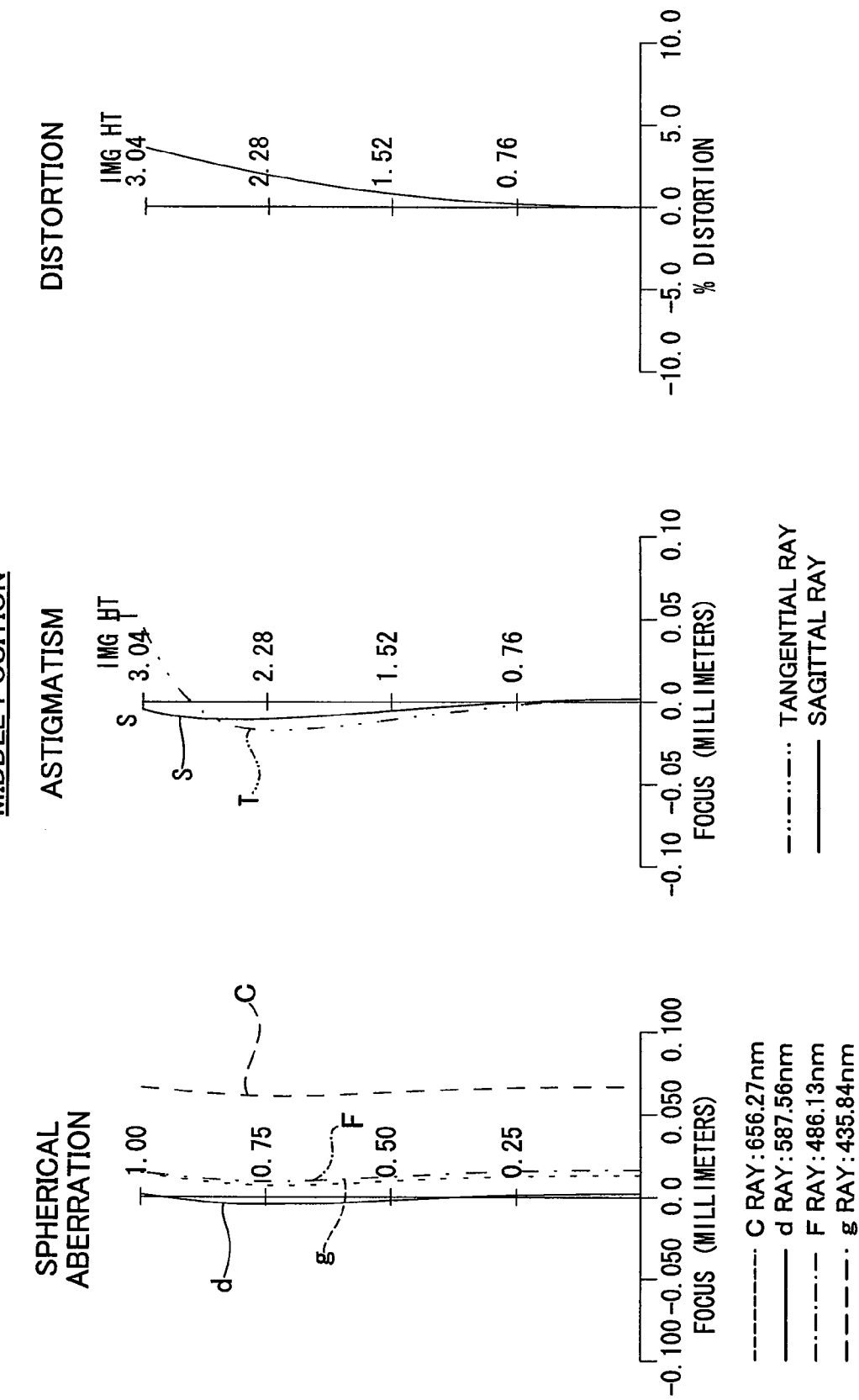
FIG. 29 shows the aberration characteristics at a middle position between the wide-angle end and the telephoto end in the third embodiment.
Figure 30:
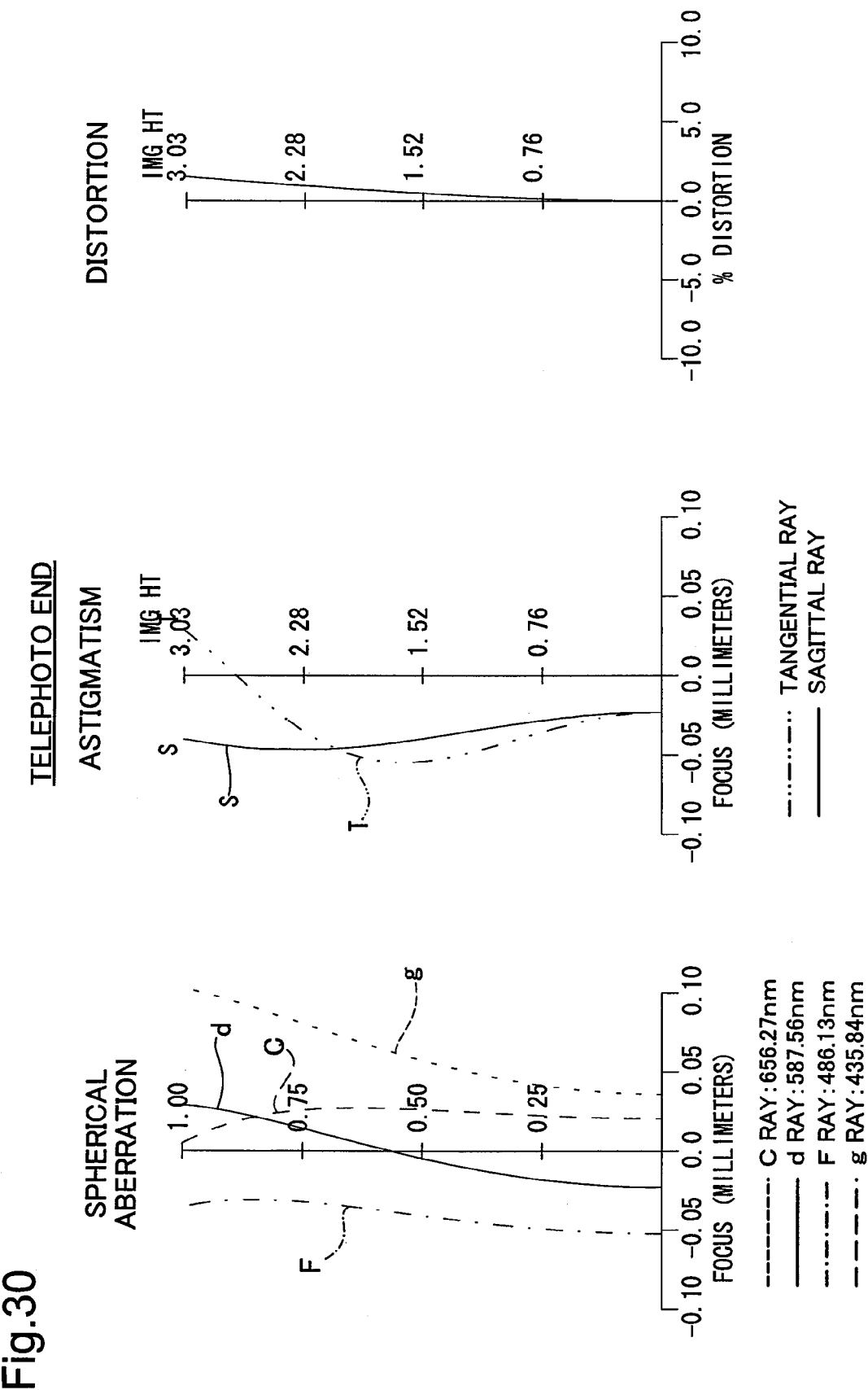
FIG. 30 shows the aberration characteristics at the telephoto end in the third embodiment.

FIG. 28 through FIG. 33E are explanatory diagrams showing the aberration characteristics of the zoom lens 100C. FIG. 28 shows the aberration characteristics at the wide-angle end in the third embodiment. FIG. 29 shows the aberration characteristics between the wide-angle end and the telephoto end in the third embodiment. FIG. 30 shows the aberration characteristics at the telephoto end in the third embodiment. FIG. 31A through 31E show the transverse aberration at the wide-angle end in the third embodiment. FIG. 32A through 32E show the transverse aberration at middle between the wide-angle end and the telephoto end in the third embodiment. FIG. 33A through 33E show the transverse aberration at the telephoto end in the third embodiment. FIG. 28 through FIG. 33E correspond, respectively, to FIG. 6 through FIG. 1E in the first embodiment.

As showed in FIG. 28 through FIG. 30, while the zoom lens 100C in the third embodiment has a high variable magnification, as was the case with the zoom lens 100 according to the first embodiment, the spherical aberration, astigmatism, and distortion are improved over the range of the wide-angle end through the telephoto end.

FIG. 31A through E, respectively, show transverse aberration when the incident angles of the rays that are incident into the zoom lens 100C are 39.82°, 37.98°, 34.26°, 20.69°, and 0.00°. FIG. 32A through 32E, respectively, show transverse aberration when the incident angles of the rays that are incident into the zoom lens 100C are 13.42°, 12.68°, 11.18°, 6.449°, and 0.00°. FIG. 33A through E, respectively, show transverse aberration when the incident angles of the rays that are incident into the zoom lens 100C are 4.294°, 4.039°, 3.531°, 2.002°, and 0.00°.

With regard to the amount of shift from the reference point when each of the individual wavelengths is used in the respective states from the wide-angle side to the telephoto side when the d ray is used as the reference, as shown in FIG. 31A through 31E, at the wide-angle end they are no more than the 0.0039 mm for the C ray, no more than 0.0037 mm for the F ray, and no more than 0.0030 mm for the g ray; as shown in FIG. 32A through 32E at the middle position they are no more than the 0.0015 mm for the C ray, no more than 0.0061 mm for the F ray, and no more than 0.0124 mm for the g ray; and as shown in FIG. 33A through 33E, at the telephoto end they are no more than the 0.0079 mm for the C ray, no more than 0.0014 mm for the F ray, and no more than 0.0197 mm for the g ray.

The provision of the structure characterized as described above not only enables a wide field angle in excess of 80° at the wide-angle end, with a high variable magnification in excess of 10× for the zoom lens 100C according to the third embodiment, but also enables the provision of a small zoom lens with excellent performance, that suppresses various types of aberration in the respective states from the wide-angle end through the telephoto end. Moreover, in the zoom lens 100C according to the third embodiment, the first lens group is structured from six simple lenses, and so can be miniaturized when compared to the zoom lenses of the first embodiment and the second embodiment.

D. Alternative Embodiments (1) While in the various examples of embodiment described above, the zoom lens is applied to an imaging device such as a camera for an overhead projector, a monitor camera, a digital still camera, or the like, the zoom lens may be applied to a projector, or the like, instead.

(2) While in the various examples of embodiment described above, the first lens group of the zoom lens is composed of six lenses, instead of the first lens group may be composed of less than six lenses, or more than six lenses.

Although the present invention has been described and showed in detail, it is clearly understood that the same is by way of illustration and example only and is not to be taken by way of limitation, the spirit and scope of the present invention being limited only by the terms of the appended claims.

What is claimed is:

1. A zoom lens comprising:
    a first lens group that has positive refractive power and is constituted by a plurality of lenses including at least one aspherical surface, and is arranged at the furthest object side;
    a second lens group that has negative refractive power and is arranged at the image side of the first lens group;
    a third lens group that has positive refractive power and is arranged at the image side of the second lens group; and
    a fourth lens group that is used for focusing, has positive refractive power and is arranged at the furthest image side; wherein
    the first lens group is, in order from the object side towards the image side, constituted by a first lens, a second lens and a plurality of lenses, wherein the first lens is a concave lens having concave surface that faces to the image side, and the second lens is a meniscus lens having at least one surface formed in a meniscus shape.

2. The zoom lens in accordance with claim 1, satisfying:
    $0.55 < d/d0 < 1.1$;
    $11 < |f2/fG1|$;
    $-16.8 < f1/fw < -11.5$;
    $-2.5 < f1/fG1 < -1.45$; and
    $0.13 < H1'/fG1 < 0.2$;
    wherein d0 is thickness of the second lens on the optical axis; d is thickness of the second lens in the normal direction at an arbitrary height from the optical axis in the effective radius of the surface of the image side of the second lens; fi is the focal distance of the i-th lens when viewed from the object side; fw is the focal distance at the wide-angle end of the entire system; fG1 is the focal distance of the first lens group; and H1' is the distance from the apex of the final surface of the first lens group to the back side principal point of the first lens group.

3. The zoom lens in accordance with claim 1 or claim 2, wherein the first lens group comprises:
    the first lens;

the second lens;

a third lens that is a convex lens having convex surface faces to the object side;

a fourth lens that is a concave lens having concave surface that faces to the image side;

a fifth lens that is a convex lens having convex surface that faces to the object side; and a sixth lens that is a convex lens having convex surface that faces to the object side.

4. The zoom lens in accordance with claim 3, wherein the first lens group has a five-group/six-element lens configuration wherein the fourth lens and the fifth lens are joined.

5. The zoom lens in accordance with claim 1 or claim 2, wherein the second lens is made of a resin material.

6. The zoom lens in accordance with claim 1 or claim 2, wherein the third lens group includes at least one aspherical surface.

* * * * *